United States Patent
Dunlap et al.

(10) Patent No.: US 9,137,301 B1
(45) Date of Patent: Sep. 15, 2015

(54) CLIENT BASED OPPORTUNISTIC ROUTING

(75) Inventors: David Alexander Dunlap, Seattle, WA (US); Tal Saraf, Seattle, WA (US); Nicholas J. Maniscalco, Seattle, WA (US); Benjamin W. S. Redman, Seattle, WA (US); Martin Cornelis Frederik Slot, Dublin (IE); Bradley E. Marshall, Bainbridge Island, WA (US)

(73) Assignee: Amazon Technologies, Inc., Reno, NV (US)

( * ) Notice: Subject to any disclaimer, the term of this patent is extended or adjusted under 35 U.S.C. 154(b) by 1058 days.

(21) Appl. No.: 12/494,916

(22) Filed: Jun. 30, 2009

(51) Int. Cl.
*H04L 29/08* (2006.01)
*H04L 29/06* (2006.01)
*H04L 12/24* (2006.01)
*G06F 15/167* (2006.01)

(52) U.S. Cl.
CPC ........ *H04L 67/1002* (2013.01); *H04L 65/4084* (2013.01)

(58) Field of Classification Search
CPC ............ H04L 67/1002; H04L 41/0896; H04L 65/4084
See application file for complete search history.

(56) References Cited

U.S. PATENT DOCUMENTS

| | | | |
|---|---|---|---|
| 6,421,726 B1 | 7/2002 | Kenner | |
| 6,502,125 B1 | 12/2002 | Kenner | |
| 6,647,389 B1 | 11/2003 | Fitch | |
| 6,789,123 B2 | 9/2004 | Li | |
| 6,850,965 B2 | 2/2005 | Allen | |
| 6,925,651 B2 | 8/2005 | Foster | |
| 7,054,935 B2 | 5/2006 | Farber | |
| 7,082,221 B1 | 7/2006 | Jiang | |
| 7,133,905 B2 | 11/2006 | Dilley | |
| 7,257,640 B1 | 8/2007 | Callocchia | |
| 7,472,178 B2 | 12/2008 | Lisiecki | |
| 7,502,858 B2 | 3/2009 | Gupta | |
| 7,509,430 B2 | 3/2009 | Oota | |
| 7,574,499 B1 * | 8/2009 | Swildens et al. | 709/223 |
| 2002/0091848 A1 | 7/2002 | Agresta et al. | |
| 2004/0249939 A1 * | 12/2004 | Amini et al. | 709/225 |
| 2005/0097445 A1 | 5/2005 | Day | |
| 2008/0072264 A1 * | 3/2008 | Crayford | 725/86 |
| 2009/0037361 A1 | 2/2009 | Prathaban et al. | |
| 2009/0119409 A1 * | 5/2009 | Gordon et al. | 709/231 |

OTHER PUBLICATIONS

Dilley, "Globally Distributed Content Delivery," IEEE Internet Computing, Sep. 2002.
Amazon CloudFront Developer Guide API Version Jun. 30, 2008, Amazon Web Services LLC.
Response to Office Action dated May 30, 2012, U.S. Appl. No. 12/494,878.
Response to Office Action dated May 30, 2012, U.S. Appl. No. 12/494,900.
Office Action dated Mar. 19, 2012, U.S. Appl. No. 12/494,878.

(Continued)

*Primary Examiner* — Suraj Joshi
(74) *Attorney, Agent, or Firm* — Novak Druce Connolly Bove + Quigg LLP

(57) ABSTRACT

When a client requests content from a Content Delivery Network (or other system), a first portion of the content is requested from a source capable of providing high performance to that client. When the client has a sufficient amount of the content to perform its function, then additional portions of the content can be requested from a source that provides a lower performance to that client with a minimal or no performance penalty to the user of the client.

17 Claims, 13 Drawing Sheets

(56) References Cited

OTHER PUBLICATIONS

Office Action dated Mar. 14, 2012, U.S. Appl. No. 12/494,900.
"Final Office Action dated Jun. 28, 2012", U.S. Appl. No. 12/494,878, 33 pages.
"HTTP Cookie", Wikipedia Article, http://en.wikipedia.org/wiki/HTTP_cookie, 2009, 2 pages.
"Non Final Office Action dated Oct. 2, 2013", U.S. Appl. No. 12/494,900, 3 pages.
"Non Final Office Action dated Oct. 8, 2013", U.S. Appl. No. 12/494,878, 29 pages.
"Response to Office Action dated May 30, 2012", U.S. Appl. No. 12/494,916, 14 pages.
Turner, Andrew, "Geolocation by IP Address", http://www.linuxjournal.com/article/7856, Oct. 25, 2004, 1 page.

* cited by examiner

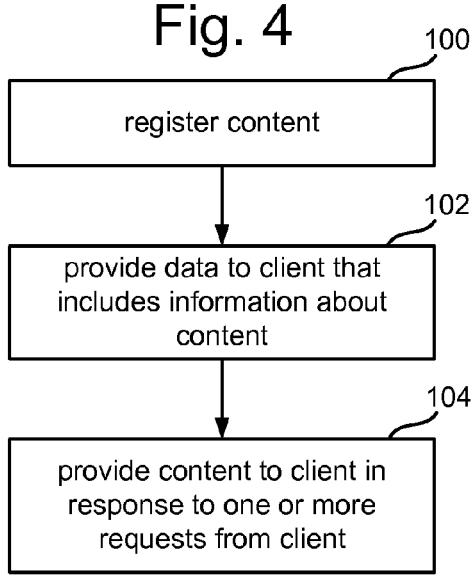
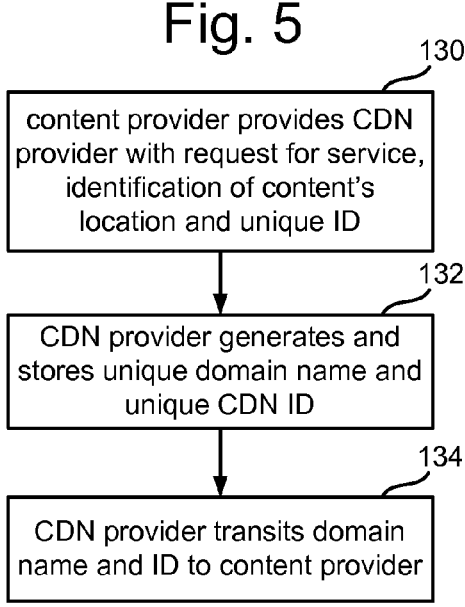
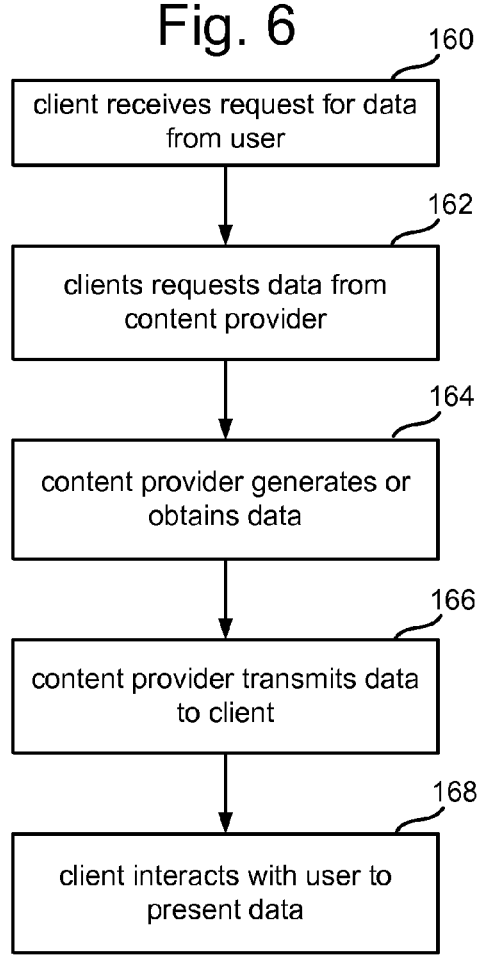

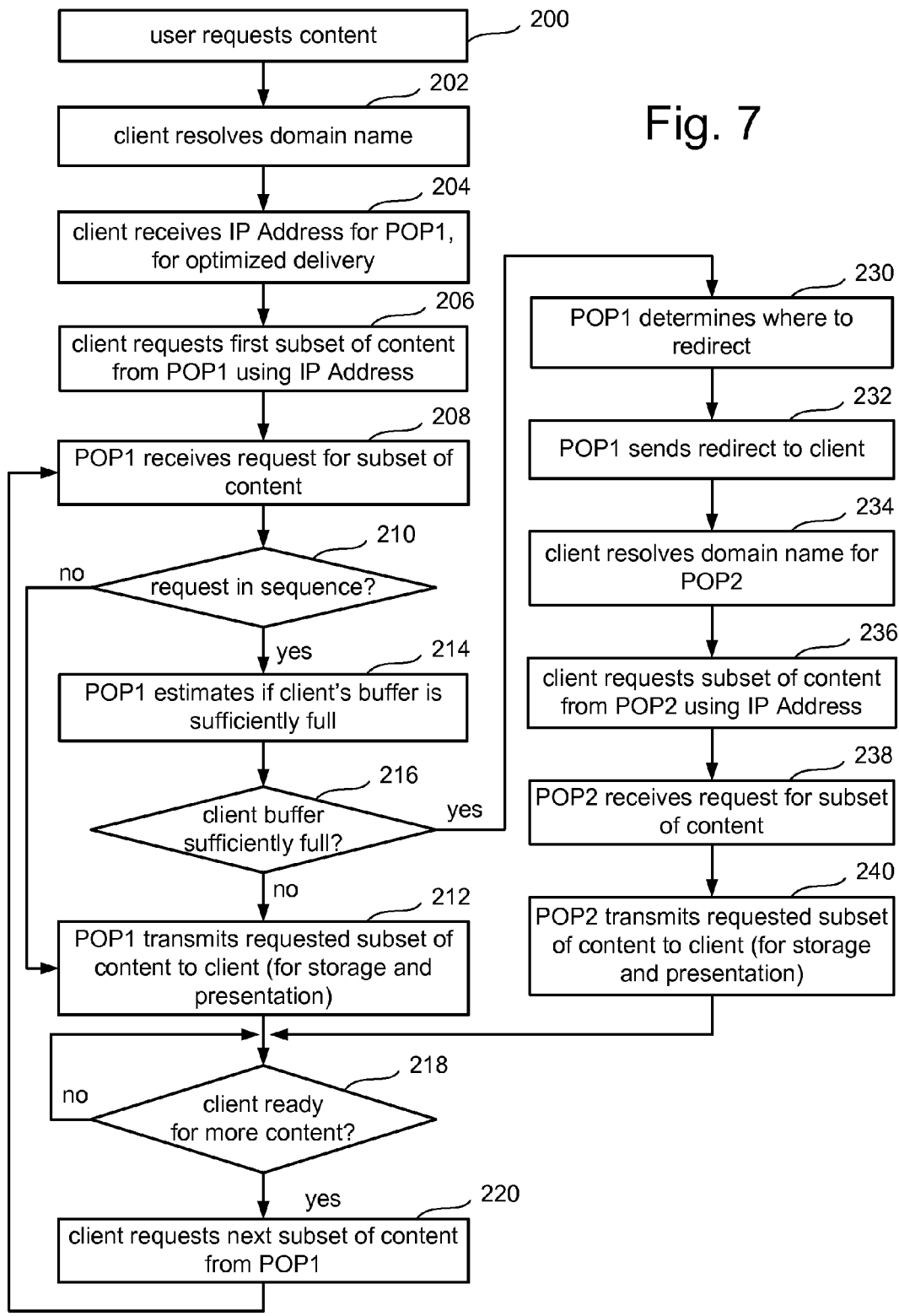

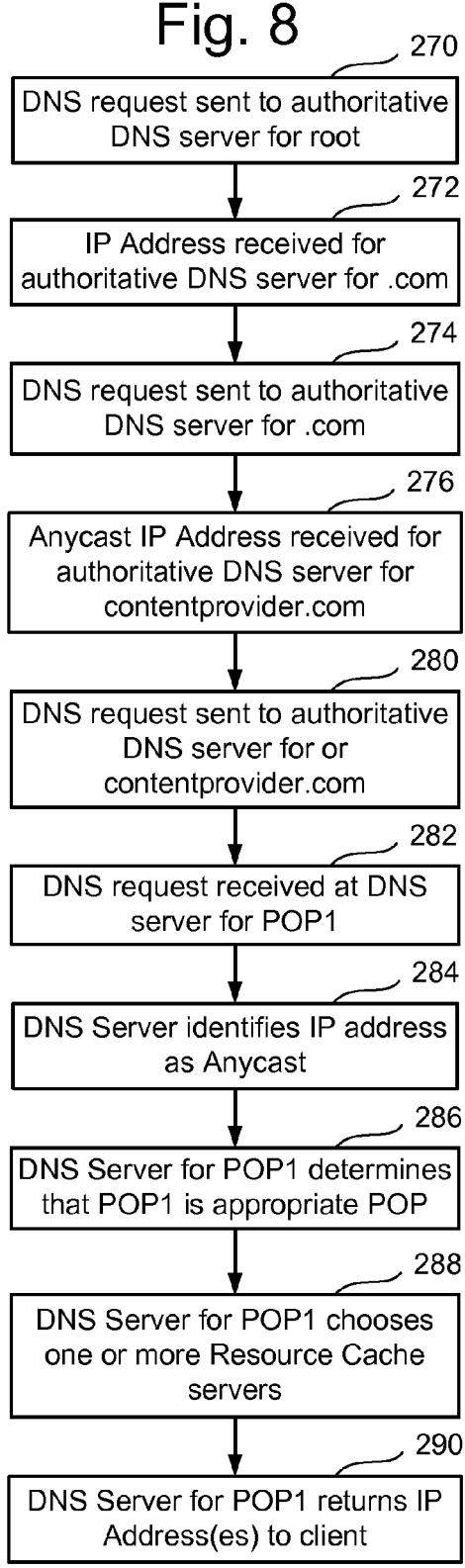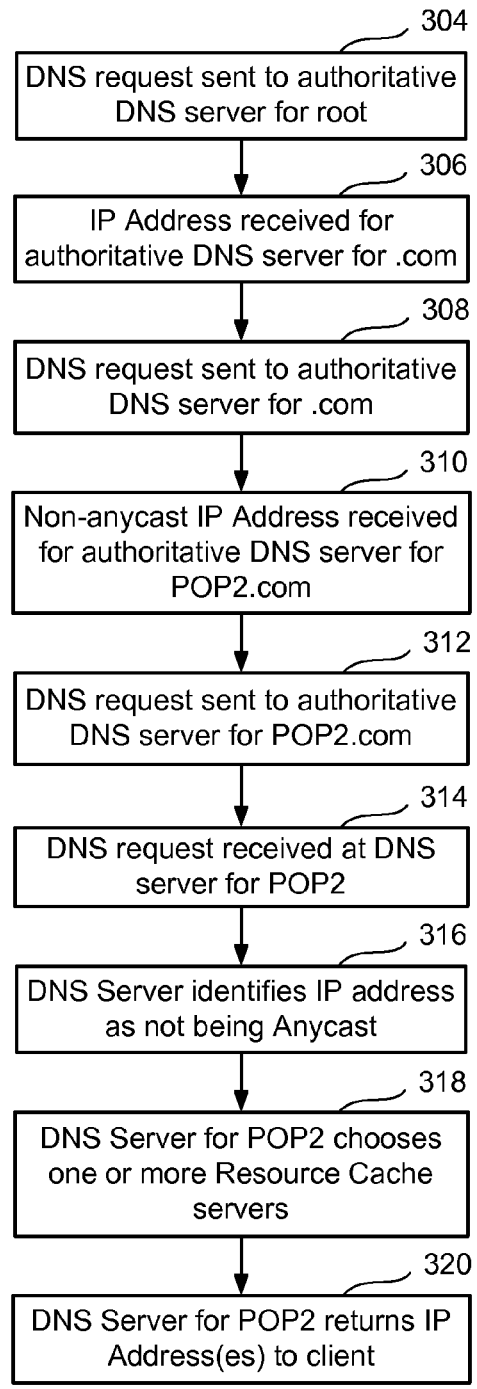

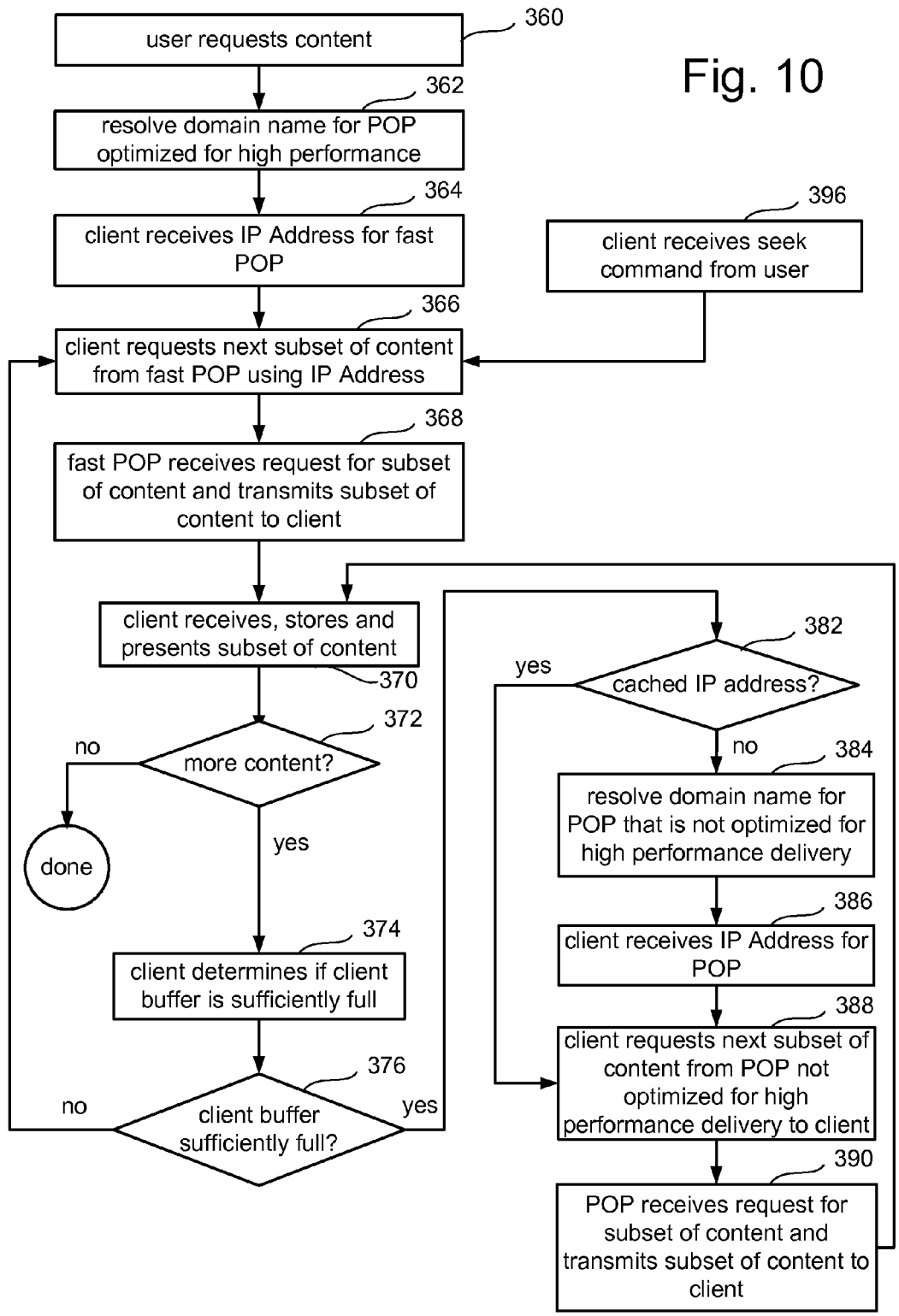

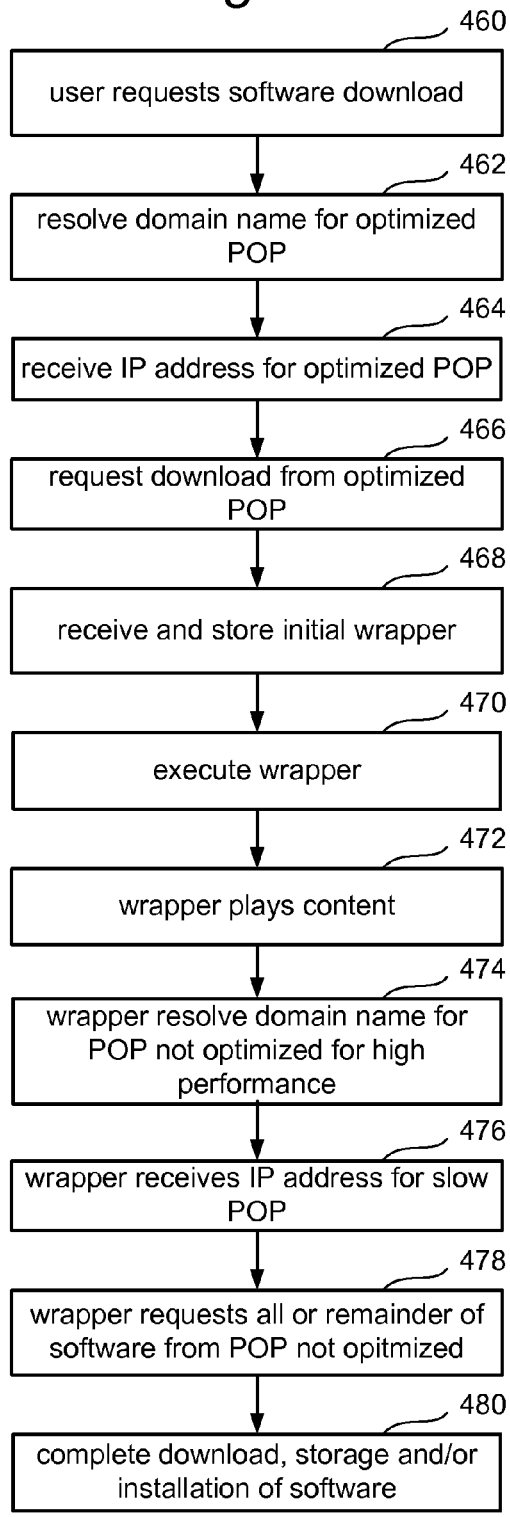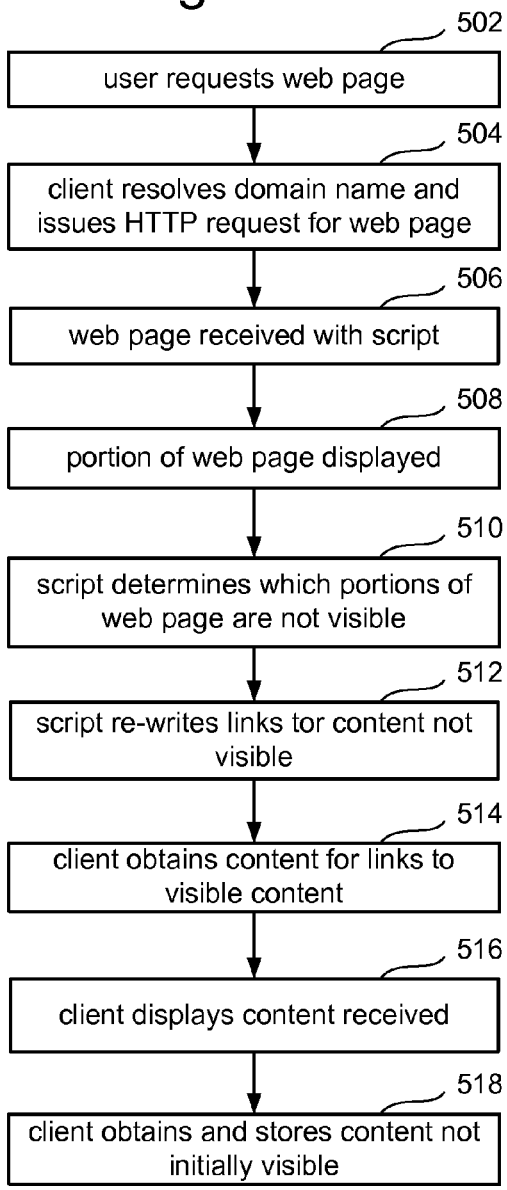

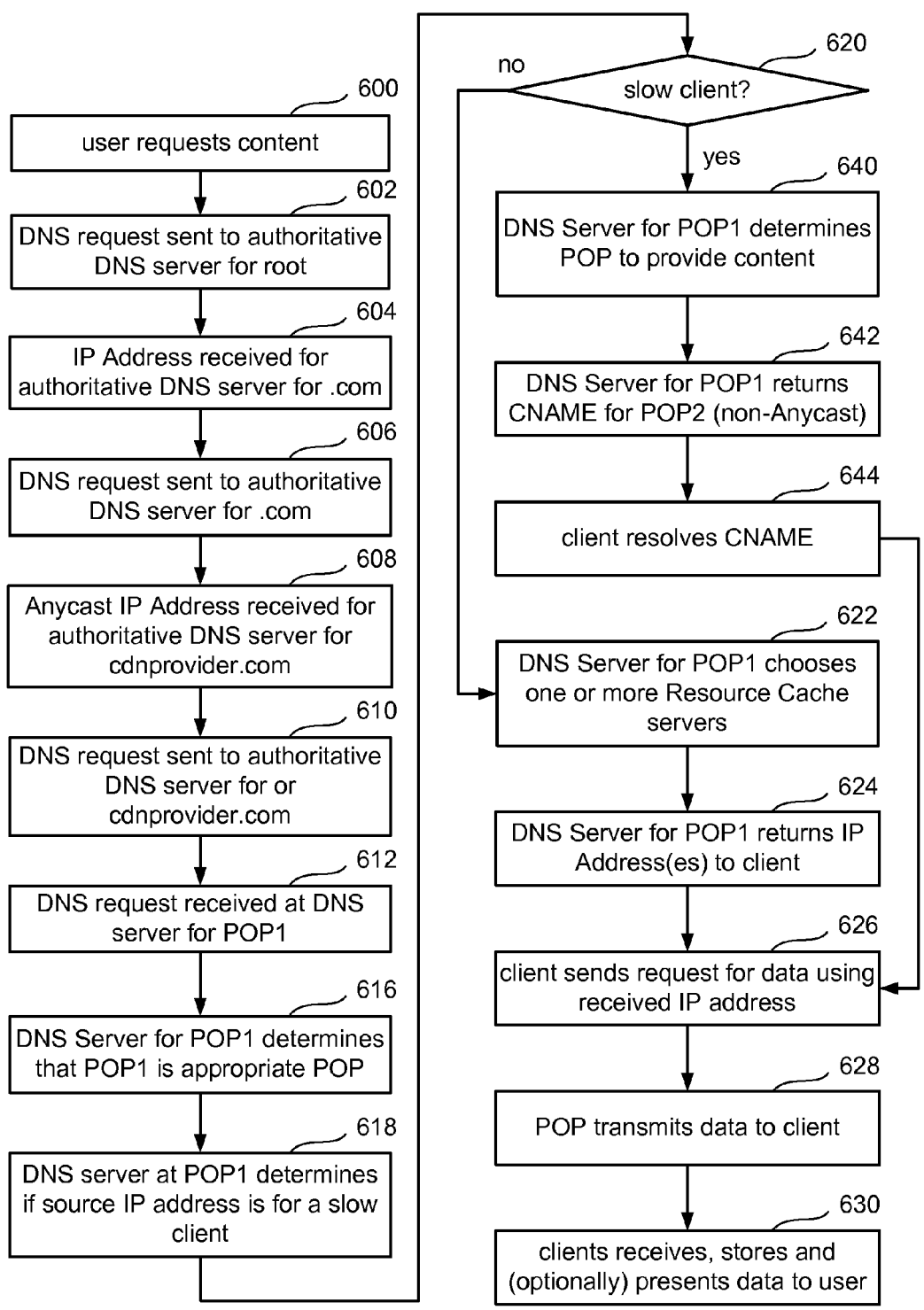

CLIENT BASED OPPORTUNISTIC ROUTING

BACKGROUND

A large amount of content is available on the Internet. For example, users can access audio, still images, videos, software, data sets and other content on the Internet. As more users access larger content, such as movies and music, the demand for faster delivery has increased.

One solution that has been implemented to meet this demand is the use of Content Deliver Networks ("CDNs"). In general, a CDN is a web service for content delivery that maintains a geographically dispersed network of edge locations that can each store copies of content. Each edge location, also referred to as a Point of Presence ("POP"), can include one or multiple servers. Clients requesting the content are routed to the nearest edge location so the content is delivered with the best possible performance. To achieve the best possible performance, the edge locations are typically high performance data centers that are able to respond to requested loads during peak times.

However, providing the high performance data transmission can be expensive to the provider of the CDN.

BRIEF DESCRIPTION OF THE DRAWINGS

The components in the drawings are not necessarily to scale relative to each other. Like reference numerals designate corresponding parts throughout the several views.

FIG. 4 is a flow chart describing one embodiment of a process for implementing a content delivery network.

FIG. 5 is a flow chart describing one embodiment for performing registration with a content delivery network.

FIG. 6 is flow chart describing one embodiment of a process for providing data from a content delivery network to a client.

FIG. 7 is a flow chart describing one embodiment for providing content to a client from a content delivery network while optimizing the routing.

FIG. 8 is a flow chart describing one embodiment for resolving a domain name.

FIG. 9A is a flow chart describing one embodiment for resolving a domain name.

FIG. 10 is a flow chart describing one embodiment for providing content to a client from a content delivery network.

FIG. 11 is a flow chart describing one embodiment of a process for downloading software.

FIG. 12 is a flow chart describing one embodiment of a process for obtaining a web page.

FIG. 13 is a flow chart describing one embodiment for providing data to a client from a content delivery network.

DETAILED DESCRIPTION

Technology is described herein for optimizing the delivery of content based on cost and latency issues. Thus, high performance can be experienced by the end user, while lowering costs to the provider of the CDN. For example, when providing content to a client from a CDN based system, the system will transmit all or portions of the content from a source capable of providing high performance to that client when the client and/or user of the client can benefit from the high performance. The system will transmit all or portions of the content from a source providing lower performance to that client when the client and/or user of the client cannot benefit from the higher performance. The technology described herein can also be used with systems other than CDNs.

In one set of embodiments, when a client requests content from a CDN based system (or other type of system), a first portion of the content is transmitted to the client from a source capable of providing high performance to that client. When the client has a sufficient amount of the content to perform its function, then additional portions of the content can be transmitted to the client from a source that provides a lower performance to that client with minimal or no performance penalty to the user of the client.

In another set of embodiments, the system (CDN based system or other type of system) will determine whether the client is using a slow connection. If not, content is transmitted to the client from a source capable of providing high performance to that client. If the system determines that the client is using a slow connection, then the content is transmitted to the client from a source that provides a lower performance to that client.

Figure 1:
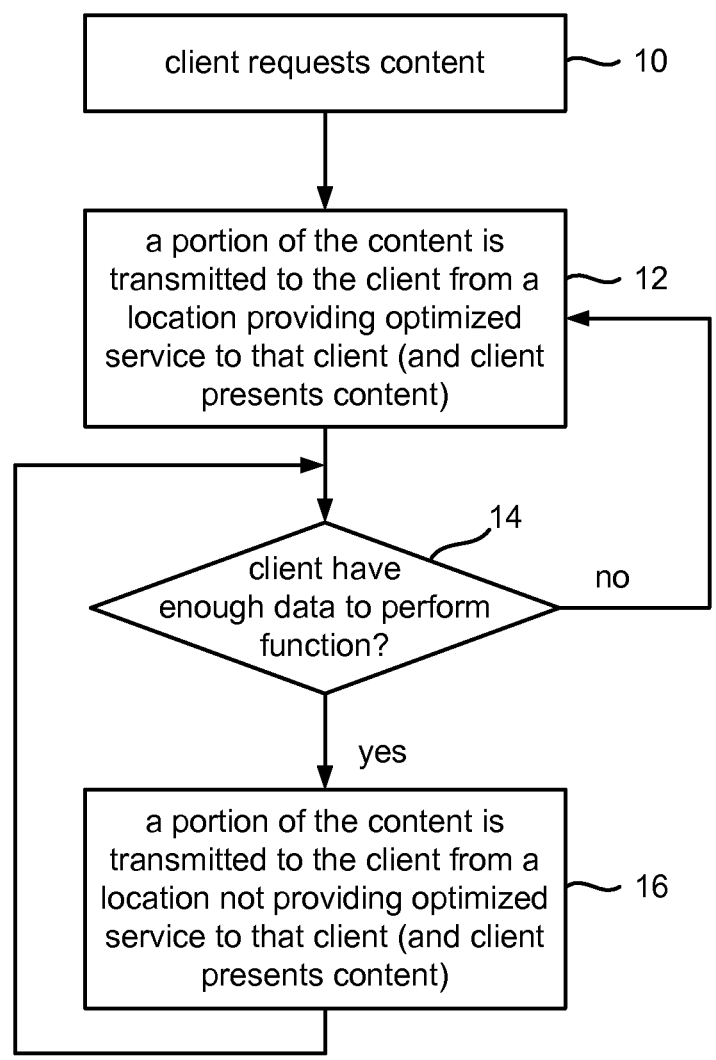
FIG. 1 is a flow chart describing one embodiment for optimizing the routing delivery of content.

FIG. 1 is a flow chart describing the general concept for optimizing the routing delivery of content according to one set of embodiments. In step 10, a client requests content. The client can be any computing device. The content can be any type of content that can be transmitted between computing devices. Examples of content are (but are not limited to) audio, video, web pages, data files, software, photos, etc. No particular type of content is necessary for the technology described herein. The client's request is provided to a server, network of servers or any other type of storage device that can store and transmit content. it is contemplated that content can be provided to the client from multiple locations. Each location may have its own set of one or more servers that store a copy of the content and can provide that content to the client. For example, the content can be provided from a POP of a CDN.

In step 12, a portion of the requested content is transmitted to the client from a location that can provide service to that client that is optimized for high performance delivery to that client. One example of being optimized for high performance delivery is to provide the fastest delivery. Servers can be optimized for various parameters, including high performance, costs, etc. The location providing the content in step 12 is optimized for high performance delivery for the client receiving the content. In one example implementation, a server optimized for high performance delivery for a client in one location may not be optimized for high performance delivery for a client in a second location.

In response to receiving that portion of the content, the client will store the content and begin presenting the content to the user of the client. In step 14, it is determined whether the client has enough data to perform its function for which it requested the content. For example, if the content is video, step 14 can include determining whether there is enough video in the client's video buffer such that the client can start playing the video and the client can obtain more video data before the buffer is depleted. In addition to video, other streaming media can also be used. In other embodiments, other types of content can be used. In another example where a client is downloading data to be consumed or operated on by an application, the client will determine whether enough of the data has been provided to the application so that the application can commence operation and will not need to be paused or be suspended in order to wait for additional data. Other examples are provided below. If the client does not have enough data to perform its function, then the process loops back to step 12 and another portion of the content is transmitted to the client from the location that provides optimized service to the client. If it was determined that the client does have enough data to perform its function for which it requested the content, then the additional content is transmitted to the client from a location that is not optimized for high performance delivery to that client in step 16. For example, the location providing the content in step 16 may be optimized for cost or not optimized at all.

In response to receiving the content in step 16, the client will store the content and present the content to its user. For example, when a video data buffer is sufficiently filled, obtaining further video from a slow location will provide no harm to the person watching the video. On the other hand, there can be a cost savings for the provider of content from using the slower location. After step 16, the process loops back to step 14 to determine whether the client has enough data to perform its function for which it requested the content. When the client has received all the data that it has requested, the process of FIG. 1 is completed.

In one example, a video application client may send an initial set of one or more requests for portions of a movie that are responded to by transmitting the requested portions of the movie from a POP able to provide the fastest delivery. The POP is part of a CDN. Upon receiving the first portion of the movie, the video application starts playing the movie. While playing the movie, additional portions of the movie are transmitted to the video application from the POP able to provide the fastest delivery. Once the video application has more than X bytes (or X seconds) of the movie stored in its buffer, but not yet played, then additional portions of the movie can be sent to the video application from a POP that provides slower delivery. If the buffer becomes diminished so that is has less than X bytes (or X seconds) of the movie stored, then additional portions of the movie will be transmitted from a POP able to provide the fastest delivery.

Figure 2:
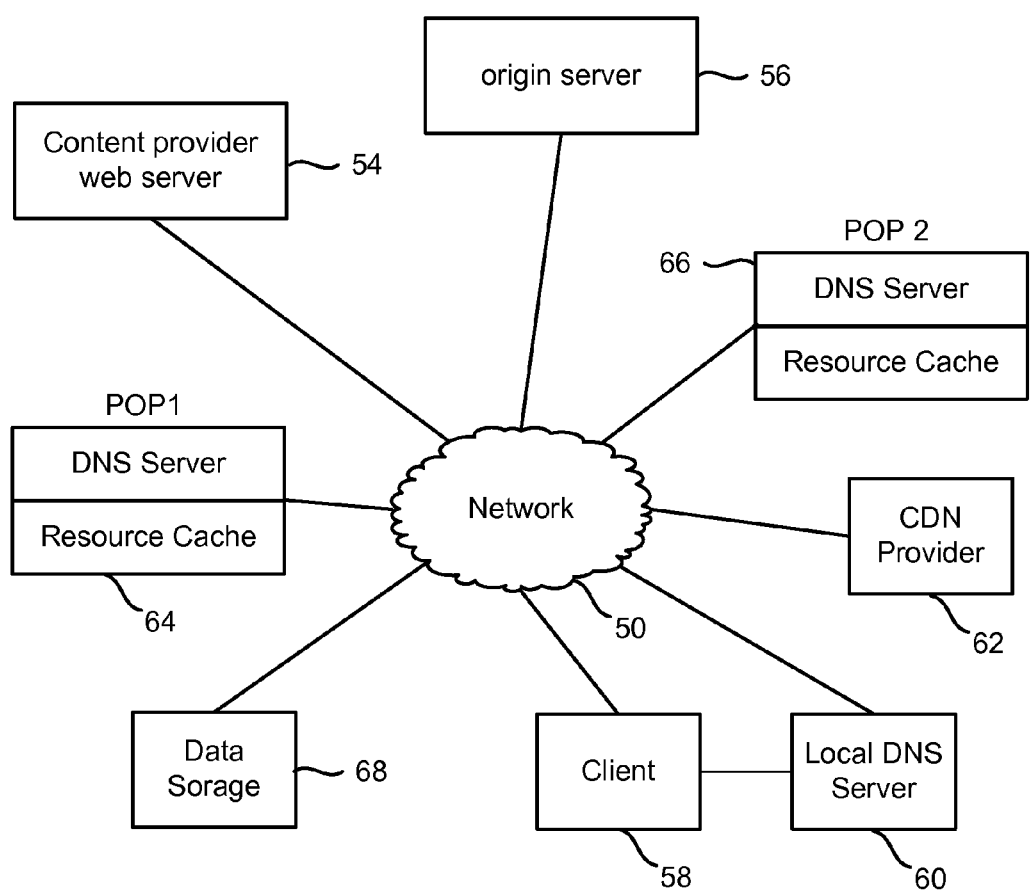
FIG. 2 is a block diagram depicting various components involved in optimizing the routing delivery of content.

In one embodiment, but not all embodiments, the content is provided to the client from a CDN. FIG. 2 is a block diagram describing one embodiment of the components of one example of a CDN. FIG. 2 shows a network 50 which can be the Internet, another global network, a WAN, a LAN, wireless network, or other type of communication means. Connected to that network are a content provider 54, origin server 56, client 58, local DNS server 60, CDN provider server 62, first Point Of Presence 64 ("POP1"), and second Point of Presence 66 ("POP2").

As described above, client 58 can be any computing device that can communicate with network 50. Local DNS server 60 can be a separate host than client 58 that provides DNS services to client 58. In another embodiment, local DNS server 60 is part of client 58. In another embodiment, local DNS server 60 is provided by the Internet service provider ("ISP").

Any CDN-based system will include a number of content providers. For example purposes, FIG. 2 shows one content provider 54. The content provider includes one or more web servers for accepting client content requests (e.g., a request for a web page), and for returning the requested content. For purposes of this document, a server is a physical computing devices or a software entity on a physical computing device that can receive requests and respond to those requests with data. Content provider 54 maintains, or otherwise designates, an origin server 56 that maintains the original copies of content to be provided by the CDN-based system. In one embodiment, origin server 56 is co-located, co-owned, or co-managed with content provider web server(s) 54. In other embodiments, origin server 56 can be remote from content provider web server 54. In some embodiments, origin server 56 can be owned by an entity other than the content provider (e.g. the CDN provider), but leased by the content provider or otherwise used by the content provider to store originals of various content.

In one embodiment, the CDN-based system will include CDN provider 62, POP1 and POP2. Although FIG. 2 shows two POPs, in many embodiments a CDN-based system will include multiple POPs. In general, the CDN-based system seeks to have multiple copies of original content stored at different POPs. In one embodiment, the various POPs will be located around the world (or another region) so that for each user who requests content, there will be a POP relatively local to that user. By obtaining a copy of the content from a local POP rather than the origin server, users will receive the content much quicker. However, it is noted that in one embodiment, each of the POPs will perform at the same level and thereby transmit data from the POP to network 50 at the same transmission rate; however, that data may reach the client with different latencies due to geography. That is, data from a local POP will reach client 58 quicker than data from a remote POP, even if both POPs transmit to the network at the same transmission rate.

For purposes of example, it will be assumed that POP1 is located at a first geographical location that is near client 58 and POP2 is located as a second geographical location that is remote from client 58. Thus, due to the time needed to traverse the topology of the Internet, a communication from POP1 will likely reach client 58 faster than a communication from POP2 even though POP1 and POP2 transmit data to the network at the same transmission rate.

Each POP (e.g., POP1 and POP2 of FIG. 2) includes a Domain Name System ("DNS") component made up of one or more DNS-based servers for resolving DNS queries from client computers. Each POP also includes a Resource Cache component made up of one or more Resource Cache servers for storing resources (e.g., copies of content) from content providers and transmitting various requested resources to various client computers. The DNS component and the Resource Cache component are considered to be logically grouped, regardless of whether the components, or a portion of the components, are physically separate. Additionally, although POPs that are illustrated in FIG. 1 are logically associated with the CDN provider, the POPs will be geographically distributed in a manner to best serve the various demographics of client computers.

Figure 3:
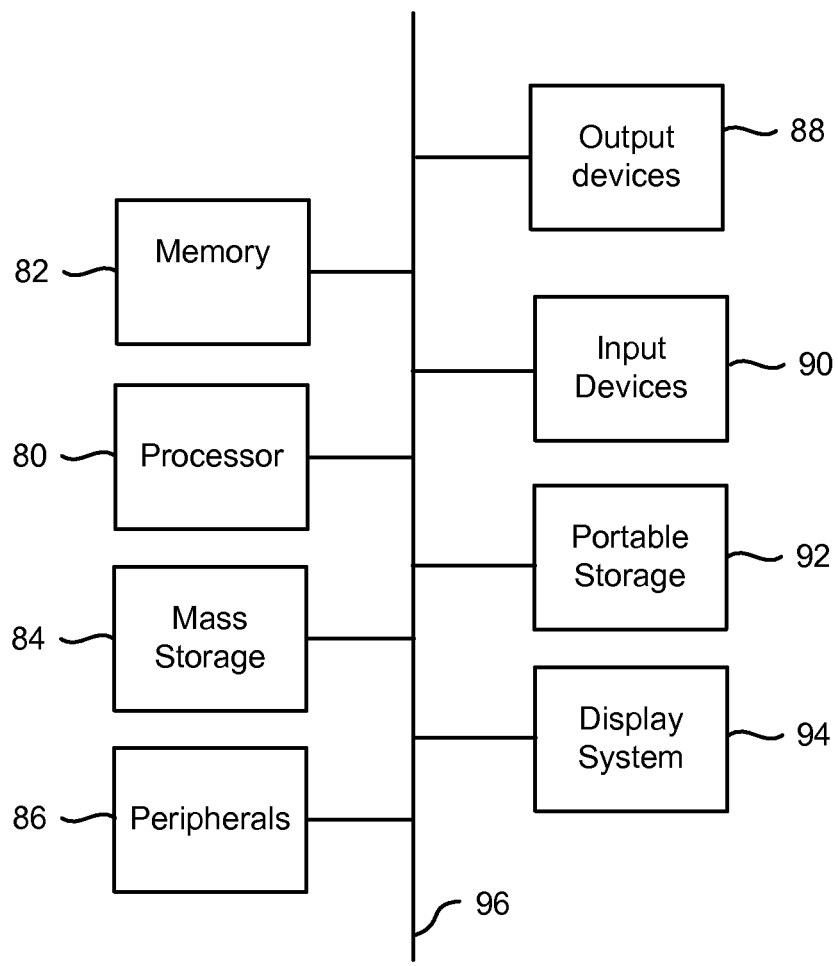
FIG. 3 is a block diagram describing one embodiment of a computing device.

FIG. 3 is a high level block diagram of a computing system which can be used to implement any of the computing devices of FIG. 2. The computing system of FIG. 3 includes processor 80, memory 82, mass storage device 84, peripherals 86, output devices 88, input devices 90, portable storage 92, and display system 94. For purposes of simplicity, the components shown in FIG. 3 are depicted as being connected via a single bus 96. However, the components may be connected through one or more data transport means. In one alternative, processor 80 and memory 82 may be connected via a local microprocessor bus, and the mass storage device 84, peripheral device 86, portable storage 92 and display system 94 may be connected via one or more input/output buses.

Processor 80 may contain a single microprocessor, or may contain a plurality of microprocessors for configuring the computer system as a multiprocessor system. Memory 82 stores instructions and data for programming processor 80 to implement the technology described herein. In one embodiment, memory 82 may include banks of dynamic random access memory, high speed cache memory, flash memory, other nonvolatile memory, and/or other storage elements. Mass storage device 84, which may be implemented with a magnetic disc drive or optical disc drive, is a nonvolatile storage device for storing data and code. In one embodiment, mass storage device 84 stores the system software that programs processor 80 to implement the technology described herein. Portable storage device 92 operates in conjunction with a portable nonvolatile storage medium, such as a floppy disc, CD-RW, flash memory card/drive, etc., to input and output data and code to and from the computing system of FIG. 3. In one embodiment, system software for implementing the present invention is stored on such a portable medium, and is input to the computer system via portable storage medium drive 92.

Peripheral devices 86 may include any type of computer support device, such as an input/output interface, to add additional functionality to the computer system. For example, peripheral devices 86 may include one or more network interfaces for connecting the computer system to one or more networks, a modem, a router, a wireless communication device, etc. Input devices 90 provides a portion of a user interface, and may include a keyboard or pointing device (e.g. mouse, track ball, etc.). In order to display textual and graphical information, the computing system of FIG. 3 will (optionally) have an output display system 94, which may include a video card and monitor. Output devices 88 can include speakers, printers, network interfaces, etc.

The components depicted in the computing system of FIG. 3 are those typically found in computing systems suitable for use with the technology described herein, and are intended to represent a broad category of such computer components that are well known in the art. Many different bus configurations, network platforms, operating systems can be used. The technology described herein is not limited to any particular computing system.

FIG. 4 is a flow chart describing one embodiment of a process for operating the CDN-based system of FIG. 2. In general, content provider 54 will register content with CDN provider 62 in step 100. Registering the content makes the content available on the CDN. After registration, the content will then be available to clients via the CDN. In step 102, client 58 will request data from client provider 54. The data requested can include a web page, a series of menus, directories, etc. No particular type of data is required. Content provider 54 will provide the requested data in step 102. In step 104, client 58 will request content referenced in the data received in step 102 and that content will be provided to the client. In some implementations of step 104, the content provided at step 104 will include content from one or more of the POPs. Since data can be transmitted from a POP to client 58 faster than from origin server 56 or web server 54, it is advantage for the client to obtain large resources from the closest POP. In one example, step 102 will include a client requesting and obtaining a menu of movies to watch and step 104 will include the client selecting and presenting one of the movies from the menu.

FIG. 5 is a flow chart describing one embodiment of a process for registering content. The process of FIG. 5 is one example of performing step 100 of FIG. 4. In step 130, content provider 54 provides CDN provider 62 with a request for service. That request for service includes an identification of the content to be served by the CDN. For example, content provider 54 provides an identification of the location of the content. Content provider 54 will also provide a unique ID that CDN provider 62 can distinguish between requests for service. In one embodiment, content provider 54 will perform the registration using a registration API (Application Program Interface). The API will include identification of the content provider's origin server 56 and the resources in origin server 56. In response to the request for service, CDN provider 62 will generate and store a unique domain name to identify the content that is the subject of the request in step 130. CDN provider 62 will also create and store a unique ID (the CDN ID referring to that content) in step 132. In step 134, CDN provider 62 will transmit that newly generated domain name and CDN ID to content provider 54 in response to step 130. Going forward, the content provider will use that domain name to identify content.

In one embodiment, the domain name generated by the CDN provider at step 132 includes two portions: an Origin ID and a generic domain name of the CDN provider (e.g. cdn-provider.com). Upon completion of the registration process, content provider 54 translates the URLs of resources embedded in a web page (or other content) to reference both the returned Origin ID and the generic domain of the CDN provider. Generally, the embedded resources to be provided to clients by the content provider will be associated with a URL that identifies the domain of the content provider (e.g., contentprovider.com), a name of the resource to be requested (e.g., "resource.xxx"), and a path where the resource will be found (e.g., "path"). The original URL has the form of:

http://www.contentprovider.com/path/resource.xxx

As described above, the Origin ID allows the CDN provider to identify the appropriate origin server of the requested resource without requiring that the host name or the content provider be included in the translated URL. After the URL translation process, the translated URL has a DNS portion identified with the domain of the CDN provider (e.g., "cdn-provider.com"). Additionally, the DNS portion of the translated URL includes the Origin ID previously provided by CDN provider 62 to content provider 54 in step 134. The translated URL also has a path portion which identifies the same name of the resource to be requested (e.g., "resource.xxx") and the same path where the resource will be found (e.g., "path"). The translated URL has the form of:

http://OriginID.cdnprovider.com/path/resource.xxx

In summary, before content provider 54 registers with CDN provider 62 for CDN provider to serve resource.xxx, content provider 54 will identify resource.xxx to clients using the original URL. After content provider 54 registers with CDN provider 62 for CDN provider to serve resource.xxx, content provider 54 will identify resource.xxx to clients using the translated URL.

In an alternative embodiment, the content provider can continue to use URLs that reference the content provider's domain name and an authoritative DNS server for the content provider will include a CNAME entry that associates the domain name from step 134 to the content provider's domain name. One example of the form of such a CNAME entry includes:

identifier.contentprovider.com CNAME OriginID.cdnprovider.com.

In this embodiment, when a client sends a DNS request to resolve "identifier.contentprovider.com", the CNAME entry will be provided back to the client. In response to the CNAME entry, the client will then attempt to resolve OriginID.cdnprovider.com. Either of these embodiments, as well as other embodiments, can be used with the technology described herein.

FIG. 6 is flow chart describing one embodiment of a process for providing data to a client, where the data contain information about content. For example, a client can be provided with a menu of movies to watch. The process of FIG. 6 is one embodiment of performing step 102 of FIG. 4. In step 160 of FIG. 6, client 58 receives a request for data from a user. For example, the user may ask a browser on a computing device for a web page. Alternatively, a user interacting with an audio-visual device (e.g., set top box) may request information for a set of menus. In step 162, client 58 requests data from content provider 54. In step 164, content provider 54 generates or otherwise obtains the data requested in a manner well known in the art. In step 166, content provider 54 transmits that data to client 58. In step 168, client 58 will present that data and interact with the user in regard to the data. In one embodiment, the data provided to client 58 in step 166 includes a number of embedded URLs. As discussed above, the original embedded URLs have been translated to the new embedded URLs that include the domain name of the CDN provider and the originID. In one example, step 168 includes providing a menu of choices, such as choices of movies to watch, music to listen to, etc.

FIG. 7 is a flow chart describing one embodiment of a process for providing content to the client. For example, after a user of the client is provided with a menu of choices (see step 168 of FIG. 6), the user will select one of the choices (e.g., a user chooses a movie to watch). The process of FIG. 7 describes one embodiment for providing the chosen content (e.g., the chosen movie) from the CDN (or other source) to the client. The process of FIG. 7 is one example implementation of step 104 of FIG. 4.

In step 200 of FIG. 7, the user chooses one of the content items (e.g., chooses a video) by selecting a link or other item on a user interface. In response to the user's choice, client 58 will download the requested content. As noted, one example of the URL associated with the link to the content is:

http://OriginID.cdnprovider.com/path/resource.xxx

In accordance with traditional Internet protocols, client computer 58 will first need to resolve the domain name. As is well known in the art, communication on the Internet is based on IP addresses. The domain name resolution process of step 202 will resolve the domain name ("OriginID.cdnprovider.com") to an IP address in the form of XXX.XXX.XXX.XXX. As part of the domain name resolution process, the CDN will provide an IP address for the most appropriate POP. In one embodiment, the most appropriate POP is the POP closest to client 58. In other embodiments, other criteria can be used to find the most appropriate POP. For example purposes only, this discussion will assume that POP1 is the most appropriate POP for client 58. Therefore, in step 204, in response to the client's request to resolve a domain name, the client will receive an IP address for POP1. It is assumed, for this example, that POP1 for high performance delivery. In some embodiments, more than one IP address can be returned through the domain name resolution process. For example, up to eight IP addresses can be returned. In some embodiments, when multiple IP addresses are returned, the operating system for the client will randomly choose one of the IP addresses. In some implementations, an operating system will cycle through the various returned IP addresses when making subsequent requests. In other embodiments, the same IP address will continue to be used.

After receiving the IP address for POP1, client 58 will then request content from a Resource Cache server of POP1 using the IP address. In one example, the content is very large and cannot be transmitted all at once. Therefore, client 58 will issue a set of requests, each request asking for a different subset of the content. For example, if the content is a movie, the first request will be for the first X bytes of the movie, the second request will be for the second X bytes of the movie, the third request will be for the third X bytes of the movie, etc. If the user performs a seek (forward or backward) to a different location in the movie, the appropriate set of bytes will be requested.

There are many ways for a client to request subsets of content. In one embodiment, the client will use HTTP to electronically request content. For example, a GET command can be used. However, in other embodiments, other protocols (including proprietary protocols) can also be used. When using HTTP, a client can use a Range header. That is, HTTP allows the requesting device to include headers in the HTTP request. One of those headers can be a Range header that indicates a byte range. For example, if the client was requesting the first one thousand bytes, one of the headers in the HTTP request would be "Range: bytes=0-999." In another embodiment, the client can use query strings to indicate a byte range for the content. Examples of query strings include "?start=1000&end=1999." This query string indicates that the user wants bytes starting at byte 1000 and ending at byte 1999. In another embodiment, a client and server can use a proprietary protocol which allows for the transferring of chunks of files.

In step 206, the client uses any of the options discussed above, as well as other options known in the art, for electronically requesting a first subset of content from POP1 using IP address returned by the domain name resolution process in step 204. The Resource Cache server of POP1 that is the target of the IP address received in step 204 will receive the electronic request for the subset of content in step 208. That Resource Cache server will determine whether the request is in sequence. That is, if the previous request asked for bytes 0-999, then the current request would be in sequence if it asks for bytes 1000-1999. However, if the previous request was for bytes 0-999 and the current request is for bytes 8200-8199, then the current request is not in sequence. If the current request is not in sequence (step 210), then in step 212 the Resource Cache server of POP1 will transmit the requested subset of content to the client 58. That content will be received by the client 58, stored by client 58 and presented to the user by client 58 (or another component). In other embodiments, client 58 can perform other operations with the received content.

If, in step 210, it is determined that the current request is in sequence, then in step 214 the Resource Cache server of POP1 will estimate whether the client's buffer is sufficiently full. For example, if the user of client 58 is requesting to play a movie, client 58 will typically download a portion of the movie to store in the client's buffer. When the buffer is at a certain level, the movie will begin to play. The client application will play the movie from the buffer. Therefore, two processes will be happening simultaneously: the application will be playing the movie from the buffer and additional movie data will be electronically transmitted from the appropriate server into the buffer. Since the movie does not start playing until the buffer has data, the CDN is used to provide the first one or more subsets of content as fast as possible to the client application buffer so that the movie can start playing as soon as possible. Once there is sufficient data in the buffer, it may no longer be necessary to send data to client 58 as fast as possible because client 58 is showing the movie using the data in the buffer. Whether the data gets there faster or slower will not make a difference because there is enough data in the buffer so that client does not need any new data for some period of time much longer than the transmission time. In that case, the CDN can conserve resources by using a source of the content that is less expensive than POP1. For example, if POP1 is from the east coast of the United States and it is currently early Saturday night, many users may be downloading video putting a large demand on POP1. On the other hand, POP2 may be located in Asia for which it is morning and, therefore, there is very little demand on POP2. Having the content be provided from POP2 instead of POP1 may conserve resources for the CDN, and may not detectable by the user of client 58.

There are many different means for estimating whether the client buffer is sufficiently full. In one embodiment, an application on client 58 that is requesting the content could include an indication of the amount of data in the buffer in a query string, in header information or in a different part of the request. That information will be used to determine whether the client buffer is sufficiently full in step 216.

In another embodiment, a TCP window can be used to determine whether the client buffer is sufficiently full. For example, a TCP window indicates the amount of outstanding (unacknowledged by the recipient) data a sender can send on a particular connection before it gets acknowledgement back from the receiver that it has gotten some of the data. For example, if a pair of hosts are talking over a TCP connection that has a TCP window size of 64 KB, the sender can only send 64 KB of data and then must stop and wait for acknowledgement from the receiver that some or all of the data has been received. If the receiver acknowledges that all the data has been received, the sender is free to send another 64 KB. If the sender gets back acknowledgement from the receiver that the receiver only received the first 32 KB (which could happen if the second 32 KB was still in transit or lost), the sender can only send another 32 KB since it cannot have more than 64 KB of the unacknowledged data outstanding. If the sender does not have acknowledgement back that any of the 64 KB has been received, then the current window is at zero and the sender cannot send any more data. In the present situation, since Resource Cache server of POP1 is sending date to client 58, if the window is down to zero, the Resource Cache server of POP1 assumes that client 58 cannot accept any more data and POP1 will conclude that client 58 cannot accept data because its buffer is sufficiently full. In other embodiments, POP1 will only conclude that the buffer is sufficiently full if the TCP window is at zero for a predetermined period of time.

In another embodiment, when the Resource Cache server of POP1 sends the data to client 58, the Resource Cache server of POP1 will analyze the data to determine the bit rate of the video. Thus, the Resource Cache server of POP1 will know how much (in the time domain) of the video was transmitted to client 58 by multiplying the bit rate by the amount of data transmitted. In addition, the Resource Cache server of POP1 will monitor the amount of time elapsed since the video content was sent. The Resource Cache server of POP1 can then figure out how much video, in an extreme case, was played by the application on client 58, and assumes the rest of the video not already played is in the buffer. For example, if the Resource Cache server of POP1 sent out five minutes of video (in the time domain) within the last two minutes, then the Resource Cache server of POP1 knows that at most only two minutes of video were played and at least three minutes of video is in the buffer. The Resource Cache server of POP1 will have a predetermined threshold (or variable threshold in some embodiments) for how much video needs to be in the buffer. If the amount of video calculated to be in the buffer is greater than the threshold, then the Resource Cache server of POP1 assumes that the buffer is sufficiently full.

Looking back at FIG. 7, if, in step 216, the Resource Cache server of POP1 estimates that the client's buffer is not sufficiently full, then in step 212 the Resource Cache server of POP1 transmits the requested subset of content to the client. The transmitting (in step 212 and the other steps of transmitting) can be performed directly or indirectly. In some embodiments, the transmitting server creates a particular data stream and transmits that particular data stream to the client. In step 218, client 58 determines whether it is ready for more content. If not, then client 58 does not request any more content until it is ready. If client 58 is ready for more content, then in step 220 client 58 requests a next subset of content from POP1 and the process loops back to step 208. If the video is playing without interruption by a user, then the next subset of content is likely to be the next sequential set of bytes in the video file. However, if the user requests a seek, then the next request in step 220 will be for a subset of bytes that may not be in sequence with the previous request.

The above discussion uses the term "buffer." This term is meant to generically describe any data structure that can store content. No particular structure, scheme or paradigm is required. Furthermore, determining whether the request for the subset of content is in sequence and whether the client's buffer is sufficiently full is just one example of determining whether the client has enough data to perform its intended function. Other implementations can also be used.

If, in step 216, the Resource Cache server of POP1 determines that the client buffer is sufficiently full, then the process continues to step 230, in which the Resource Cache server of POP1 determines where to redirect the request. That is, because the client buffer is sufficiently full, it is possible to have the data be provided from a POP not optimized for high performance delivery to client 58 because the extra latency in delivery will not be noticed by the client's user.

There are many different options for determining where to redirect the request. In one embodiment, each POP has a sister POP, where it is assumed that if one POP is in heavy demand, then the sister POP is in low demand. For example, if POP1 is in New York, its sister POP may be Tokyo. Criteria other than geography can also be used to determine a sister POP. In another embodiment, a central server for the CDN can be used to monitor the performance and operation of all POPs. In step 230, the Resource Cache server of POP1 would send a message to the central server asking for identification of a POP under less demand than POP1. In another embodiment, all the POPs will keep databases for information about current performance and demand on each of the POPs so that POP1 on its own can determine which POP is under a less demand than POP1. In yet another embodiment, the request for content can be redirected to a server that is not part of the CDN. For example, FIG. 2 shows data storage 68 which can be a data storage server that is not part of the content delivery network. That is, the data storage server can be in a lower performance data center, private data center or elsewhere.

After determining where to redirect the request for content, the Resource Cache server of POP1 will send a redirect to client 58 in step 232. In one embodiment, the Resource Cache server of POP1 will send a 302 redirect, which is a temporary redirect. That is, in response to the request for content, the Resource Cache server of POP1 will provide an HTTP response with status code 302. With that status code, the Resource Cache server of POP1 will provide the domain name for POP2 (assuming that in step 230 POP1 determined to redirect the request to POP2). In response to receiving a redirect from the Resource Cache server of POP1, client 58 will resolve the domain name for POP2 in step 234. With the IP address received back from the domain name resolution, client 58 will request the same subset of content from POP2. As discussed above, the client can receive up to eight addresses. One of those addresses will be used to contact one of the Resource Cache servers of POP2 in step 236 using HTTP. In step 238, POP2 will electronically receive the request for the subset of content at one of its Resource Cache servers associated with the IP address used by client 58 in step 236. In step 240, the Resource Cache server of POP2 will electronically transmit the requested subset of content to client 58 so that client 58 can store and present that content. In step 240, the process loops back to step 218.

As can be seen from the flow chart of FIG. 7, client 58 will initially send each request to POP1. If POP1 estimates that client 58 has enough data to perform its function (e.g., its buffer is sufficiently filled), then POP1 will redirect the request to POP2; otherwise, POP1 will serve the request itself. This way, when client 58 needs data, the data is provided in the fastest possible manner from POP1. On the other hand, if client 58 has enough data to perform its function and does not need additional data right away, that additional data could be provided from a more remote POP which may result in greater latency and slower delivery. Thus, even though POP1 and POP2 transmit data to the Internet at the same rate, because client 58 is close to POP1 and far from POP2, the data will arrive from POP1 faster than it will from POP2.

FIG. 8 is a flow chart describing one embodiment for performing a process of resolving the domain name for the requested content. The process of FIG. 8 is one embodiment for performing step 202 of FIG. 7. As discussed above, the first time client 58 sends a request for content, it must resolve the domain name to an IP address. The CDN takes advantage of the domain name process to assign the client to the most appropriate POP. Thus, in addition to resolving a domain name to an IP address, the most appropriate IP address is chosen to minimize latency for delivery of content. In one embodiment, the application needing content will request the DNS resolution from a DNS resolver. In one embodiment, the DNS resolver could be another application running on client 58. In other embodiments, the DNS resolver could be a local DNS server (local DNS server 60) on a local LAN, on a local WAN, within a local enterprise or in conjunction with an ISP. In step 270 of FIG. 8, the resolver will send a request to the authoritative DNS server for the root domain. That DNS server will respond with an IP address for the authoritative DNS server for ".com" in step 272. A DNS request will then be sent to the authoritative DNS server for ".com" in step 274. That authoritative DNS server for ".com" will return an IP address for the content provider's domain name. For example, the authoritative DNS server ".com" will return an IP address to the authoritative DNS server for a "cdnprovider.com." For example, the authoritative DNS server ".com" will return the IP address of one of the DNS name servers of a POP provided by the CDN provider.

In one embodiment, the CDN-based system will utilize Anycast to facilitate the selection of a DNS server that receives the DNS query by the client. In accordance with Anycast principles, the DNS components of multiple POPs share the same IP address. The transmittal of a DNS query to the shared IP address will be received by a POP that has the closest network proximity between the DNS resolver component in the client and the various POPs associated with the CDN provider (e.g., the least amount of network hops to the client). Thus, in step 276, the resolver will receive an IP address which is an Anycast address for the authoritative DNS server for a "cdnprovider.com." The DNS request will then be sent to the authoritative DNS server for a "cdnprovider.com." This DNS request will be received by the DNS server associated with the POP closest in network proximity to the resolver. In one embodiment, each POP will have two DNS servers for redundancy and the request will be received by one or both of those DNS servers in step 282. In the example provided above, the DNS request in step 280 will be received by one of the DNS authoritative name servers at POP1. In step 284, the DNS server receiving the DNS request will identify that the IP address used to contact it is an Anycast IP address. In step 286, the DNS server for POP1 will determine whether POP1 is the appropriate POP. Even though POP1 may be the shortest amount of network hops from the client, the CDN provider may have additional criteria to determine the most appropriate POP. In step 286, the DNS server for POP1 will verify whether POP1 should be the appropriate POP.

There are many different schemes for determining whether a particular POP is the most appropriate POP to deliver content in a CDN. Any one of these schemes can be used with the technology described herein. One example is provided below. However, the technology described herein is not limited to that one example. In one embodiment, a CDN-based system will have its DNS server use the following four part methodology to determine whether a particular POP is the appropriate POP for serving content from the CDN.

First, each DNS server maintains (or otherwise has access to) a database mapping a set of location identifiers with at least portions of known IP addresses (e.g., mapping a specific location identifier with a specific IP address or specific partial IP address). Utilizing the mapping database, the receiving DNS attempts to match an IP address associated with the local DNS resolver component transmitting the client DNS query ("local DNS resolver IP address") with the IP addresses in the mapping database. Assuming that the local DNS resolver IP address can be partially matched to an IP address in the mapping database, the DNS server associates the location identifier mapped to the matching IP address in the mapping database. If the local DNS resolver IP address cannot be matched to any entry in the mapping database, the DNS server defaults to assigning the location identifier associated with the receiving DNS server.

Second, based on the location identifier associated with the local DNS resolver IP address (above), the receiving DNS server then determines a destination identifier for the DNS query. Generally, the receiving DNS server determines the destination identifier according to a manually generated table in which the destination identifier is determined as a function of the location identifier. However, the receiving DNS server can provide an alternative destination identifier in accordance with the manually initiated administrative process. The selection of the initial destination identifier and the manually administrative process is as follows:

The DNS server utilizes the manually generated table mapping location identifiers to destination identifiers based on vector mapping and additional CDN administrator manipulation. The destination identifier corresponds to a definition of a geographic region encompassing one or more locations (e.g., a West Coast destination encompassing the states of Washington, Oregon and California).

The DNS server may be configured to override the default destination identifier in accordance with a manually configured exception process determined as a function of the identity of the content provider (as obtained through the OriginID included in the DNS query). In one example, a CDN administrator overrides the allocation of a destination identifier for specific OriginIDs. Such an override will be utilized in the following contexts:

i. The DNS server utilizes the content provider OriginID to ensure that the content provider's subscription allows content to be served from the destination identified in the mapping table.

ii. The OriginID has been manually designated to be associated with an alternative destination identifier to redistribute at least a portion of incoming resource requests for a particular content provider among several POPs (e.g., to avoid servicing content requests for a single web page via a single destination by offloading to a different destination).

Third, based on the selected destination identifier, the receiving DNS server selects a POP from a list of one or more POPs that have been manually determined by the CDN administrator to be capable of servicing resource requests for the identified destination. If more than one POP is identified in the list of POPS, the receiving DNS server selects a specific POP according a specified distribution allocation for the corresponding destination (e.g., POP A (75%); POP B (25%)).

Fourth, for the selected POP from the list of one or more POPs, the receiving DNS server then examines POP health information indicative of the availability of the selected POP to process incoming resource requests.

If the selected POP is available (as indicated via the POP health information), the receiving DNS server returns a CNAME that will result in the receipt of the DNS query by the selected POP (or one of a set of identified POPs). If, however, the selected POP corresponds to the current POP of the receiving DNS server, the DNS server resolves the DNS query by returning the IP address of the a Resource Cache server at the POP as the CNAME does not necessarily need to be provided (unless additional request routing processing will be implemented as described below).

If the selected POP is not available (as indicated via the POP health information), the DNS server selects an alternative POP to process the DNS query via a failover list of alternative POPs that is manually set by the CDN administrator. Specifically, the receiving DNS selects a specific alternative POP from the failover list according to a specified distribution and returns a CNAME that will result in the receipt of the DNS query by the selected alternative POP (or one of a set of POPs).

If the DNS server for POP1 determines that POP1 is not the appropriate POP, then the DNS server for POP1 will respond that another POP should attempt to resolve the client computing device's DNS query by returning a CNAME identifying the other POP.

If the DNS server for POP1 determines that POP1 is the appropriate POP (step 286), then the DNS server for POP1 will choose one or more of the Resource Cache servers to service the request for content in the future. In one embodiment, a POP will have only one Resource Cache so step 286 will not need to be performed. In other embodiments, a POP can include multiple Resources Cache servers. In one example, a POP can include 25 Resource Cache servers. One reason for that many Resource Cache servers is to load balance. In one example implementation, a POP will include four hundred IP addresses spread across the twenty five Resource Cache servers. Step 288 will include choosing eight out of those four hundred IP addresses. The choice can be random. In step 290, the DNS server for POP1 will return the eight IP addresses to the client. In other embodiments, more or less than eight IP addresses will be returned.

As described above, one embodiment includes the Resource Cache server for POP1 determining where to redirect client 58 when the Resource Cache server estimates that the client's buffer is sufficiently full (see step 230 of FIG. 7). In this embodiment, POP1 will determine the server to be redirected to and send that information to the client. In step 234 of FIG. 7, the client will need to resolve the domain name for the target of the redirection, which in the example herein is POP2. FIG. 9A is a flow chart describing one embodiment of a process used to resolve the domain name for POP2 when POP1 identifies POP2 as being the target of the redirection. The process of FIG. 9A is one example of performing step 234 of FIG. 7.

In step 304 of FIG. 9A, the client 58 (e.g., through its resolver) sends a DNS resolution request to the authoritative DNS server for the root domain. In step 306, an IP address is received back from the authoritative DNS server for the .com domain. In step 308, client 58 (e.g., through its resolver) sends a DNS resolution request to the authoritative DNS server for the .com. An example of the domain name being resolved can be POP2.com. This domain name will not be associated with an Anycast IP address because POP1 knew a specific POP that it wanted to redirect to. Thus, in step 310, a non-Anycast IP address will be received from the authoritative domain name server for .com. This IP address will be a non-Anycast IP address for the authoritative DNS server for POP2.com. In step 312, a DNS request will be sent to the authoritative DNS server for POP2.com. That DNS request will be received at the authoritative DNS server for POP2 in step 314. In step 316, the DNS server for POP2 will identify that the IP address is not an Anycast IP address; therefore, it will know that it is from a redirection. In such as case, the DNS server for POP2 will not need to determine whether POP2 is the appropriate POP. Rather, it will assume that POP2 is the appropriate POP. In step 318, the DNS server for POP2 will randomly choose one or more Resource Cache servers. For example, eight out of 400 IP addresses (see discussion above) will be chosen. In step 320, those eight (or another number) of IP addresses will be returned to client 58.

Figure 9B:
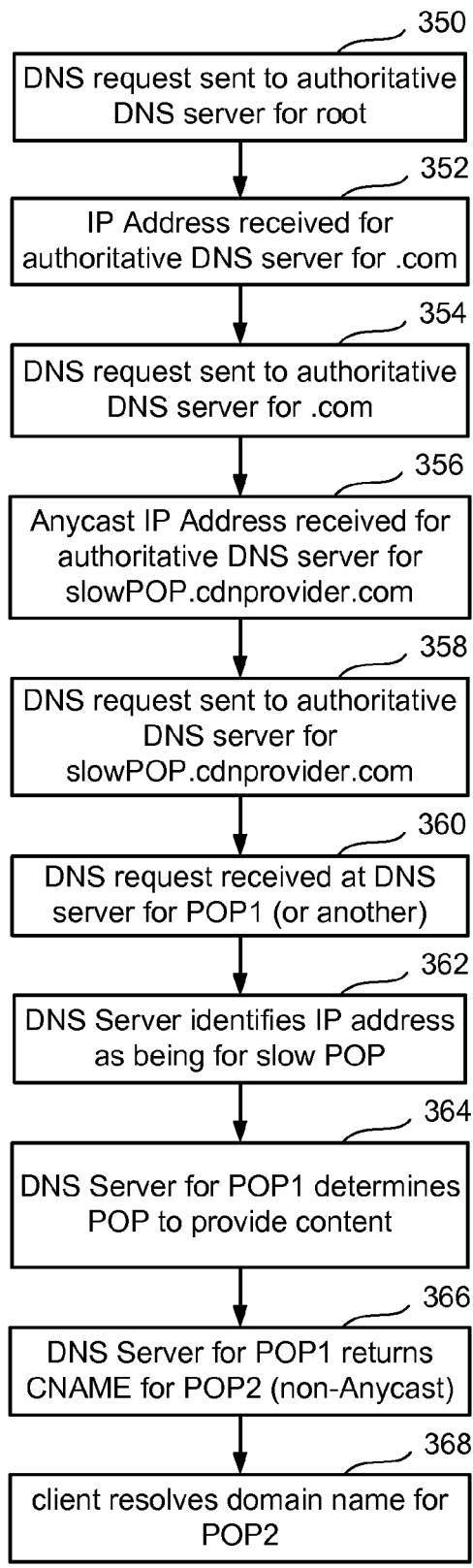
FIG. 9B is a flow chart describing one embodiment of a process for resolving a domain name.

In the embodiment discussed above with respect to FIG. 7 and FIG. 9A, POP1 determines in step 230 which POP to redirect the client to. In another embodiment, POP1 will not determine where to redirect the client. Therefore, step 230 will be skipped. Instead, the Resource Cache server or POP1 that received the initial request for content will determine that a redirection needs to take place, but will not determine where to redirect. In that case, the HTTP response with the 302 redirect response code sent in step 232 of FIG. 7 will include a generic redirection domain name such as "www.slow-POP.cdnprovider.com." In step 234 of FIG. 7, the client will resolve the domain name slowPOP.cdnprovider.com. That domain name resolution process will be used to identify the appropriate POP for the redirection. FIG. 9B is a flow chart describing one embodiment for performing a domain name resolution process of step 234 when the Resource Cache server for POP1 does not identify a specific target for the redirection, but instead identifies a generic redirection domain name such as slopPOP.cdnprovider.com.

In step 350 of FIG. 9B, client 58 will issue (e.g., through its resolver), a DNS request to the authoritative DNS server for the root and receive an IP address for the authoritative DNS server for .com in step 352. In step 354, a DNS request will be sent to the authoritative DNS server for .com in order to resolve slowPOP.cdnprovider.com. In step 356, an Anycast IP address is received from the authoritative DNS server for slowPOP.cdnprovider.com in step 356. In step 358, a DNS request is sent to the authoritative DNS server for slow-POP.cdnprovider.com using the IP address received in step 356. In step 360, that DNS request is received at the DNS server for POP1. As discussed above, the use of Anycast will cause the DNS request for the step 358 to be provided to the DNS server the least amount of hops away from the client. That DNS server is likely to be the DNS server for POP1. It is possible, in some embodiments, that the DNS request gets sent to another POP. In step 362, the DNS server for POP1 identifies that the request is for the IP address being associated with slow POP. In step 364, the DNS server for POP1 will determine another POP to redirect the client to. This determination in step 364 can use the same criteria as used in step 230 discussed above. In step 366, the DNS server for POP1 will return a CNAME for POP2. It is assumed that in step 364, the DNS server for POP1 identifies POP2 as the target for the redirection. Therefore, the POP1 will respond with the following CNAME:

slowPOP.cdnprovider.com CNAME POP2.cdnprovider.com

In step 368, the client, after receiving the CNAME, will attempt to resolve the domain name POP2.cdnprovider.com. In one embodiment, the process of FIG. 9A is used to perform step 368.

In the embodiment of FIG. 9B, the Resource Cache server for POP1 provided a generic domain name for the redirect and the CDN was then used to resolve the generic redirect. In another embodiment, the Resource Cache server for POP1 will provide a generic redirect to a central server. In that case, the HTTP response with response code 302 (the redirect) used in step 232 will be the same as used for the embodiment of FIG. 9B. That is, in step 932, the redirection will include a redirection domain name of slowPOP.cdnprovider.com. However, the process of FIG. 9C will be used to perform the resolution of the domain name in step 234.

Figure 9C:
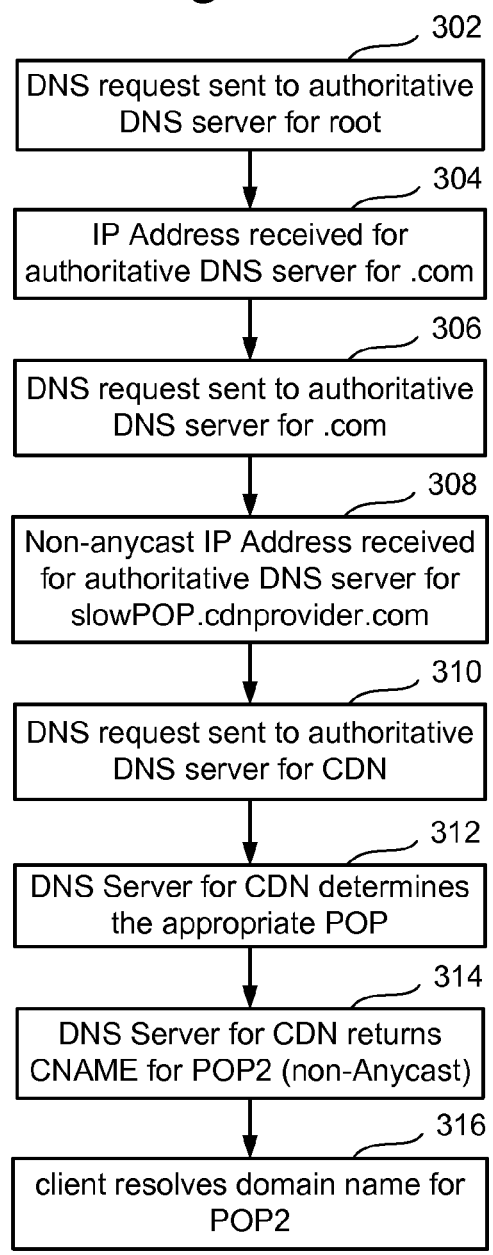
FIG. 9C is a flow chart describing one embodiment of a process for resolving a domain name.

In step 302 of FIG. 9C, client 58 (through its resolver) will send a DNS request to the authoritative DNS server for the root domain. In step 304, the authoritative DNS server for the root domain will return an IP address for the authoritative DNS server for .com. In step 306, a DNS request will be sent to the authoritative DNS server for .com, which will return a non-Anycast IP address for the authoritative DNS server for slowPOP.cdnprovider.com. In step 310, a DNS request will be sent to the authoritative DNS server for slowPOP.cdnprovider.com, which in this case is the central server for the CDN (e.g., server 62). In step 312, that central server will determine which POP should receive the redirect according to any of the techniques described above or other techniques known in the art. No specific technique for determining an alternative POP is required. In step 314, central server will return a CNAME for POP2. The IP address associated with the domain name in the CNAME entry will be a non-Anycast IP address. The CNAME of step 314 is analogous to the CNAME of step 366. In step 316, the client will resolve the domain name for POP2 using the process of FIG. 9A. Step 316 is similar to step 368.

The embodiment described above with respect to FIG. 7 contemplates a client (which can refer to a computing device or an application running on the computing device) that is not configured to be aware of or take advantage of the technology described herein for redirection to a lower cost POP when the client has enough data to perform its function. FIG. 10 is flow chart describing the operation of another embodiment where the client includes an application (or other software component) that is configured to utilize the technology described herein to optimize the delivery of content, rather than have its optimization being performed by the CDN (or other network or source). The process of FIG. 10 is another example of implementing step 104 of FIG. 4. The process of FIG. 10 (as well as the process of FIG. 7) can be used with a CDN or in an environment that does not include a CDN.

In step 360 of FIG. 10, the user requests content. For example, the user may request a particular video from a menu or a web page showing choices. Alternatively, the process of FIG. 10 can be used with other types of content described above. In step 362, client 58 will resolve the domain name for a fast POP. In one embodiment, each choice of content in the menu or other user interface will include a link. That link will reference or otherwise be associated with a POP optimized for high performance delivery. The domain name associated with that link will be resolved as per the process of FIG. 8, which uses Anycast to obtain one or more IP addresses associated with a fast POP. In step 364, the client will receive an IP address for the POP optimized for high performance delivery to the client, as per the process of FIG. 8. In step 366, the client will electronically request (e.g., using HTTP or a proprietary protocol) the next subset of content from the POP using the IP address received in step 364. If this is the first time that step 366 is being performed, then the client will request the first subset of content, as described above. In step 368, the Resource Cache server for the fast POP (e.g., POP1) electronically receives a request for a subset of content and, in response, transmits the subset of content to client 58, as described above. In step 370, client 58 receives the content, stores the content, and presents the subset of content to a user. For example, video data can be stored in a buffer and the video application can begin playing the content from the buffer by displaying the movie on a monitor. Alternatively, other content can be provided to an application, printed, displayed, transmitted, etc. In step 372, client 58 automatically determines whether it needs more content. For example, if client 58 is providing a movie to a user and the movie is over, no more content is needed and the process is done. If client 58 needs more content, then in step 374, client 58 automatically determines if it's buffer is sufficiently full. If the client's buffer is not sufficiently full (step 376), then the process continues at step 366 and client 58 will request the next subset of data from the fast POP using the IP address received at step 364.

If, in step 376, client 58 determines that its buffer is sufficiently full, then in step 382 client 58 determines whether it has cached the IP address for a POP that is not optimized for high performance delivery to client 58. Once the client resolves a domain name to an IP address (or a set of IP addresses), those IP addresses will be stored locally (e.g., cached). In step 382, the client knows that, because its buffer is sufficiently full, it can obtain the data from the POP that will provide the data slower due to latency issues because the slower POP is further away from the client than the faster POP (even when the slower POP and the faster POP transmit the data to the Internet at the same transmission rate), or from a POP that is otherwise not-optimized for high performance delivery to client 58. If client 58 does not have an IP address for the POP that is not optimized for high performance delivery, then in step 384, the client will resolve a domain name for a POP that is not optimized for high performance delivery using any of the processes of FIG. 9A, 9B or 9C. Client 58 can store its own list of POPs that are not optimized for high performance delivery (process of FIG. 9A), have POP1 determine which POPs are not optimized for high performance delivery (process of FIG. 9B), or have a central server determine which POP is not optimized for high performance delivery (process of FIG. 9c). In step 386, client 58 will receive the IP address of the POP not optimized for high performance delivery to client 58. In step 388, client 58 will electronically request (e.g., HTTP) the next subset of content from the POP not optimized for high performance delivery to client 58 using the IP address for the slower POP. In step 390, the POP not optimized for high performance delivery to client 58 will electronically receive the request for the subset of content and transmit the requested subset of content to client 58. After step 390, the process continues at step 370, when client 58 receives, stores and presents the subset of content. If, in step 382, client 58 determines that it has already cached the IP address of the POP not optimized for high performance delivery to client 58, then the process will immediately continue at step 388 at which the client will request the next subset of content from the POP not optimized for high performance delivery to client 58 using the cached IP address.

As described above, one example of content that can be used with the technology described herein is video. In other embodiments, other forms of content can be used including audio, raw data, web pages, software downloads, etc. FIG. 11 is a flow chart describing one embodiment of a process using the technology described above for downloading software. The process of FIG. 11 is another example for performing step 104 of FIG. 4. In step 460 of FIG. 11, the user requests a software download. This request can be in response to viewing a web page that provides a link to download software. In step 462, client 58 resolves the domain name associated with the link that the user chose in step 460. The process of resolving the domain name is performed according to the flow chart of FIG. 8. The domain name in the link being resolved in step 462 is associated with the POP of the CDN that is optimized for delivery to the client making the request. In other embodiments, the domain name can be associated with a POP of a network that is not a CDN. In step 464, client 58 will receive the IP address that is the result of the domain name resolution.

In step 466, client 58 will request that software be downloaded from the computing device associated with the IP address received in step 464. In one embodiment, the software can be downloaded in two phases. In the first phase, an initial wrapper is downloaded. In the second phase, the remaining portions of the software downloaded. In one embodiment, the initial wrapper will direct the remainder of the software download. In a second embodiment, the initial wrapper will not direct the remainder of the software download; however, the initial wrapper will start to be installed before the remainder of the software. In yet another embodiment, the initial wrapper will include code to be executed (e.g., display information to the user or entertainment to the user) while the remaining software is downloaded and/or installed. In step 468, client 58 will receive and store the initial wrapper in response to its request to download of step 466. In step 470, the initial wrapper will be executed. In step 472, the initial wrapper will play content. For example, the initial wrapper can provide information to the user about the software being downloaded, provide entertainment content (audio and/or video, or other entertainment). The remainder of the steps assumes that the initial wrapper directs the remainder of the software download. However, in other embodiments, the client will direct the remainder of the software download. In step 474, the software of the initial wrapper will resolve the domain name, using the process of FIG. 9A, 9B or 9C, for a POP that is not optimized for high performance delivery to the client. In step 476, the initial wrapper will receive an IP address for the POP not optimized for high performance delivery to the client. In step 478, the initial wrapper will request all or a remainder of the software from the POP not optimized for high performance delivery to the client using the IP address received in step 476. In step 480, the download will be completed, and the client will store and install the downloaded software.

FIG. 12 is a flow chart describing one example of a process for downloading a web page using the technology described herein for optimizing the delivery of content on a web page. FIG. 12 is another example of performing step 104 of FIG. 4. Sometimes, a web page is downloaded to a browser such that the web page is bigger than the available screen space on the browser. In that case, a portion of the web page that is downloaded will not be visible until the user scrolls the browser. FIG. 12 describes an embodiment for optimizing delivery will download content that is initially visible on the browser from the POP that is optimized for high performance delivery to the client. That content which will not initially be visible in the browser will be downloaded from the POP that is not optimized for high performance delivery to the client.

In step 502 of FIG. 12, the user requests a web page. For example, the user can be operating a browser that causes a web page to be displayed in the browser. In step 504, the client will resolve the domain name using the process of FIG. 8 and issue an HTTP request for the web page using the IP address returned from the domain name resolution. In step 506, the HTML content (or other type of content) for implementing the web page is received. In one embodiment, the web page content also includes a script (e.g., Java script). This script received in step 506 will be (at least partially) responsible for optimizing the delivery of some of the content of the web page. The content for the web page received in step 506 will include embedded links. The browser will be responsible for obtaining the content of the embedded links. In one embodiment, prior to obtaining the content for the embedded links, a portion of the web page will be displayed without the content from the embedded links. The browser displays placeholders where the embedded links are. Only a portion of the web page is displayed in the browser because the web page is larger than the available area that the browser is displaying. In another embodiment, the web page will not be displayed until all the content for embedded links is obtained. In step 510, the script received in step 506 will determine which portions of the web page are initially visible (or will be visible) in the browser and which portions of the web page will not be initially visible in the browser when the browser first displays the website (or other content). More specifically, the script will identify which embedded links are for content that will be initially visible and which embedded links are for content that is not initially visible. In step 512, the script will rewrite links that are content that is not initially visible. For content that is not initially visible in the browser, the links for the embedded content will be rewritten to reference a slower POP. Consider, for example, a reference for embedded content is as follows:

http://OriginID.cdnprovider.com/images/HiResImg1.jpg

This link can be rewritten as follows, for example:

http://OriginID.slowPOP.cdnprovider.com/images/HiResImg1.jpg

In step 514, client 58 will obtain content for the links associated with visible content by resolving the domain names for those links using the process of FIG. 8 and making HTTP request using the IP address received from those domain name resolutions. The content will be obtained from POPs that are optimized for high performance delivery to the client. In step 516, the content received from the links will be displayed (e.g., rendered in the browser). In step 518, client 58 will obtain and store the content that is not initially visible.

The links that have been rewritten in step 512 will be used to obtain the content that is not initially visible from POPs that are not optimized for high performance delivery to the client. The domain names in those rewritten links will be resolved using the processes of FIG. 9A, 9B or 9C. With the IP addresses received from the domain name resolution processes, the client will obtain the content using one or more HTTP requests. The content received will be stored at the client but not initially displayed because that content is not visible in the browser. The stored content will be available for later use within the browser.

In another embodiment, video can be transmitted using H.264 SVC layers. In one example implementation, small (top) layers will be transmitted to the client from a source optimized for high performance while the larger layers (higher bit rate) are transmitted to the client from source that is not optimized for high performance (e.g., a source that provides less expensive transmission).

In the embodiments described above, content is initially received from a source optimized for high performance until enough content is received so that the client can perform its function. At that point, the content is then received from a source for which the delivery is not optimized for high performance. FIG. 13 is a flow chart describing the general concept for optimizing the delivery of content according to a second set of embodiments. In the embodiments of FIG. 13, a decision is made at the start whether to get the data from the source optimized for high performance or the source not optimized for high performance. Both sets of embodiments, however, operate under the principal that content can be provided from a source not optimized for high performance in those situations where the user of the client will not be affected by the downloading of content from a slower source. In the embodiment of FIG. 13, content can be provided from a source not optimized for high performance in those situations where the client is not likely to be able to consume data at a rate that the data can be sent from the source optimized for high performance.

CDNs are typically designed to get content close to clients to remove latency and variability in network performance. Typically, the closer the data, the faster the network performance. However, clients connect to CDN hosts with quite a variety of different types of Internet access. As such, clients can take only so much data at a time. Experience has shown that in many cases a CDN can provide data to a client faster than the client can accept or otherwise consume the data. For those slow clients (e.g., clients that have a slow connection to the network or cannot process the data fast enough), the network can reroute the client's request to a source that is not optimized for high performance delivery to that client (e.g., a POP farther away, resulting in longer delivery time) because the client will not be able to accept the data faster than the source not optimized for high performance can provide. FIG. 13 is a process for providing content to a client that directs the client to the appropriate POP based on the speed of the client's connection to the Internet (of other network) or ability to otherwise consume data. The client makes a call to a DNS server (or other entity), and that DNS server determines whether the client is likely to be able to consume data at a rate that the data can be sent from the source optimized for high performance. If the client is not likely to be able to consume data at a rate that the data can be sent from the source optimized for high performance (e.g., because of a slow network connection or the client cannot process the data fast), then the DNS server routes the client to an underutilized POP or less expensive POP, rather than the closest and most expensive. In one embodiment, the process of FIG. 13 is one example for performing step 104 of FIG. 4. The term "likely" is use because, in some cases, the DNS server (or other entity) makes the determination in advance of sending the data.

In step 600 of FIG. 13, the user will request content. For example, client 58 will use HTTP to electronically make the request. In step 602, a DNS request is sent to the authoritative DNS server for the root domain. In step 604, the authoritative DNS server for the root domain will respond with an IP address for the authoritative DNS server for .com. In step 606, a DNS request will be sent to the authoritative DNS server for .com. In step 608, the authoritative DNS server for .com will provide an IP address for cdnprovider.com. In one embodiment, the domain name to be resolved in step 608 is in the form of:

http://OriginID.cdnprovider.com

The CDN system will use Anycast, as described above. In step 610, a DNS request is sent to the authoritative DNS server for cdnprovider.com using the Anycast IP address received in step 608. In step 612, that DNS request is received at the DNS server for POP1, for example. This example assumes that POP1 is optimized for high performance delivery to the client and POP2 is not optimized for high performance delivery to the client. For example, POP1 may be a high speed data center that is geographically closer to the client. In step 616, the DNS server for POP1 will determine that POP1 is the appropriate POP, using the criteria discussed above (or other criteria known in the art). In step 618, the DNS server of POP1 will automatically determine if the source IP address (the IP address of the client) is for a slow client that is not likely to be able to consume data at a rate that the data can be sent from POP1 (or other source optimized for high performance delivery). For example, the client may have a slow connection to the network, the client may not be able to process data quickly, or there may be another reason why the client consumes data at a rate that is slower than the source of the data can deliver it. There are many techniques known in the art for determining whether an IP address is associated with a slow connection to the Internet (or other network) or whether an IP address is associated with a client that is consuming data at a slow rate. If it is determined that the IP address is associated with a client that is likely to be able to consume data at a rate that the data can be sent from the source optimized for high performance delivery to the client (step 620—not a slow client), then the DNS server for POP1 will choose one or more of the Resource Cache servers associated with POP1 in step 622. In step 624, the DNS server for POP1 will return the eight (or another number of) IP addresses to client 58. In step 626, the client will send a request for data using HTTP (or another protocol) using one of the received IP addresses. In step 628, the Resource Cache server of POP1 that received the request at step 626 will transmit the data to client 58 in response to the request. In step 630, client 58 will receive the data transmitted from the Resource Cache server and store that data. In one embodiment, the data can be presented to the user, as discussed above.

If, in step 620, it is determined that the IP address is associated with a client that is not likely to be able to consume data at a rate that the data can be sent from the source optimized for high performance (slow client—see step 620), then the DNS server for POP1 will redirect the request to a source that is not optimized for high performance delivery to the client. In step 640, the DNS server for POP1 will determine the appropriate POP to provide the content to the client that is not optimized for high performance delivery to the client. In one embodiment, the DNS server for POP1 will itself directly identify the appropriate POP to serve the data. This step is similar to step 230 of FIG. 7. In another embodiment, the DNS server for POP1 will not identify the specific POP to provide the content in a slower manner. Instead, the DNS server will return a generic domain name and let another entity determine which is the appropriate POP which is not optimized for high performance delivery to the client, as described above. In step 642, the DNS server for POP1 will return a CNAME. In one embodiment, the CNAME identifies POP2. The domain name for POP2 will be associated with a non-Anycast IP address. In another embodiment, the CNAME will have a generic domain name for the non-optimized POP so that another entity can determine which is the appropriate slower POP. That CNAME entry will be sent to client 58. In step 644, client 58 will resolve the CNAME. That is, the domain name included in the CNAME entry will be resolved by the client (as discussed above) and the process will continue at step 626.

Figure 14:
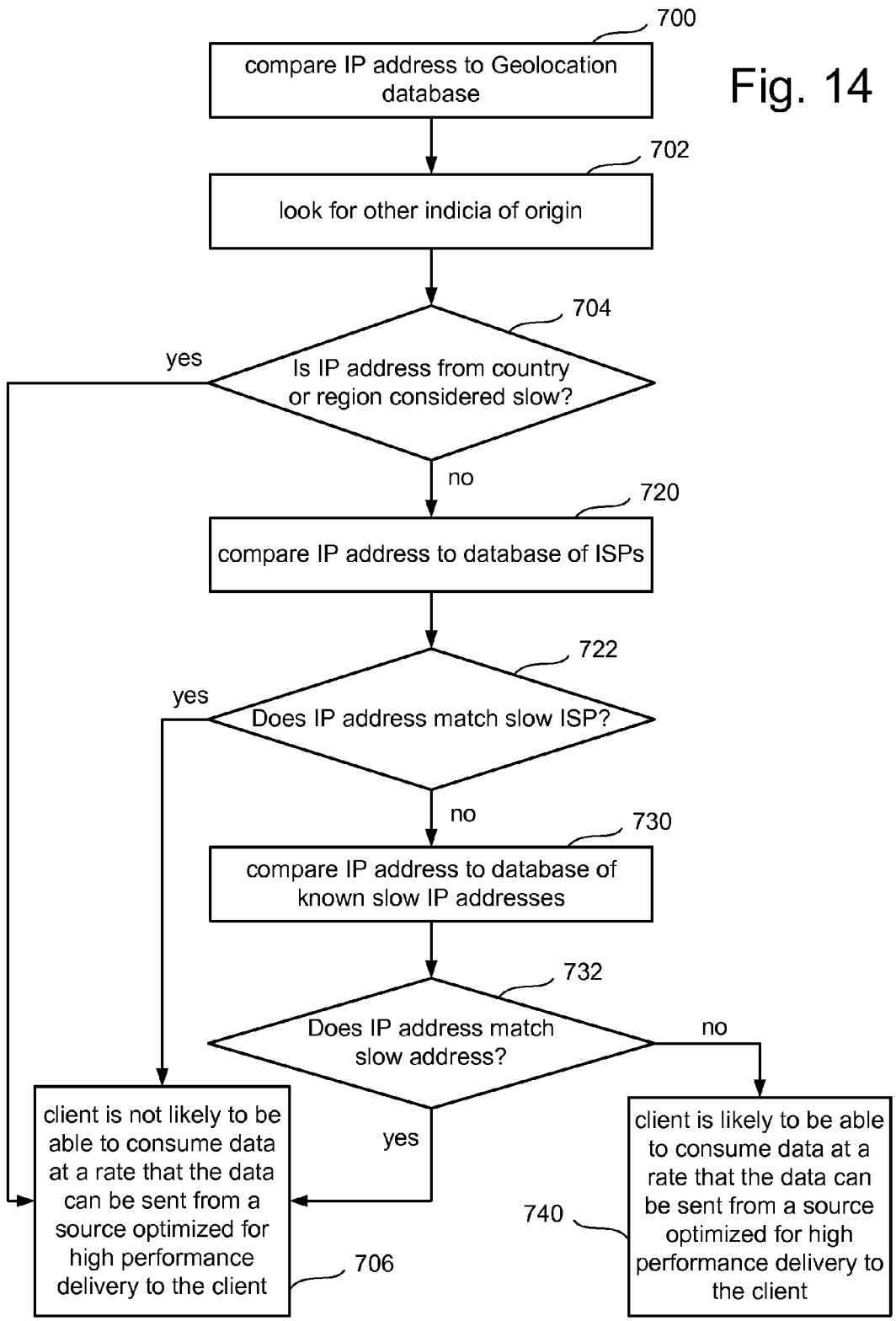
FIG. 14 is a flow chart describing one embodiment for determining if an IP address is for a slow connection.

FIG. 14 is a flow chart describing one embodiment for determining whether a source IP address is associated with a slow client that is not likely to be able to consume data at a rate that the data can be sent from a source optimized for high performance delivery to the client. FIG. 14 is one example for performing step 618 of FIG. 13. In step 700, the DNS server will compare the IP address of the source to a geolocation database. Geolocation by IP address is a known technique for determining a user's geographic latitude, longitude and, by inference, city, region and/or nation by comparing the user's public Internet IP address with known locations of other electronically neighboring servers and routers. If the IP address can be associated with a region (city, state, country, continent, etc.), then the geolocation process is successfully. In some embodiments, some IP addresses will not be able to be geolocated.

In step 702 of FIG. 14, the DNS server will look for other indicia of origin in the DNS request. Some browsers or other applications will provide data indicating the country or region of origin. That data will be identified by the DNS server in step 702. Based on data from step 700 and step 702, the DNS server will determine whether the IP address is associated with a country or region that is considered to have a slow connection to the Internet (or other network). For example, the system may know that certain rural areas only have dial-up connections. Alternatively, some countries may only have dial-up or slow types of connections to the Internet. If the DNS server determines that the IP address is associated with a country or region having a slow connection, then in step 706 the DNS server concludes that the client is not likely to be able to consume data at a rate that the data can be sent from a source optimized for high performance delivery to the client. If, in step 704, the DNS server is unable to determine that the IP address is associated with a country or region that is considered to have a slow connection, then in step 720, the IP address will be compared to a database of Internet Service Providers (ISPs). The DNS server can include a database that associates IP address with ISPs. Internet Service Providers that are known to have dial-up connections may have a fixed set of public IP addresses for those dial-up connections. The DNS server can keep track of public addresses that are associated with ISPs providing dial-up connections. If the IP address matches an ISP considered to be providing a slow connection (e.g., dial-up connection) in step 722, then in step 706, the DNS server will conclude that the client is not likely to be able to consume data at a rate that the data can be sent from a source optimized for high performance delivery to the client. If the DNS server is unable to match an IP address to an ISP that provides a slow connection (step 722), then in step 730 the DNS server will compare the IP address to a database of IP addresses known to be associated with slow clients that not able to consume data at a rate that the data can be sent from a source optimized for high performance delivery to the client. If the IP address matches one of the addresses associated on the database (step 732), then the DNS server will conclude that the client is not likely to be able to consume data at a rate that the data can be sent from a source optimized for high performance delivery to the client (step 706). Otherwise, the DNS server is unable to conclude that the client is not likely to be able to consume data at a rate that the data can be sent from a source optimized for high performance delivery to the client, in which case the DNS server will operate as if the client is likely to be able to consume data at a rate that the data can be sent from a source optimized for high performance delivery to the client Note that the order of steps of FIG. 14 can be changed from the order depicted in the Figure.

Figure 15:
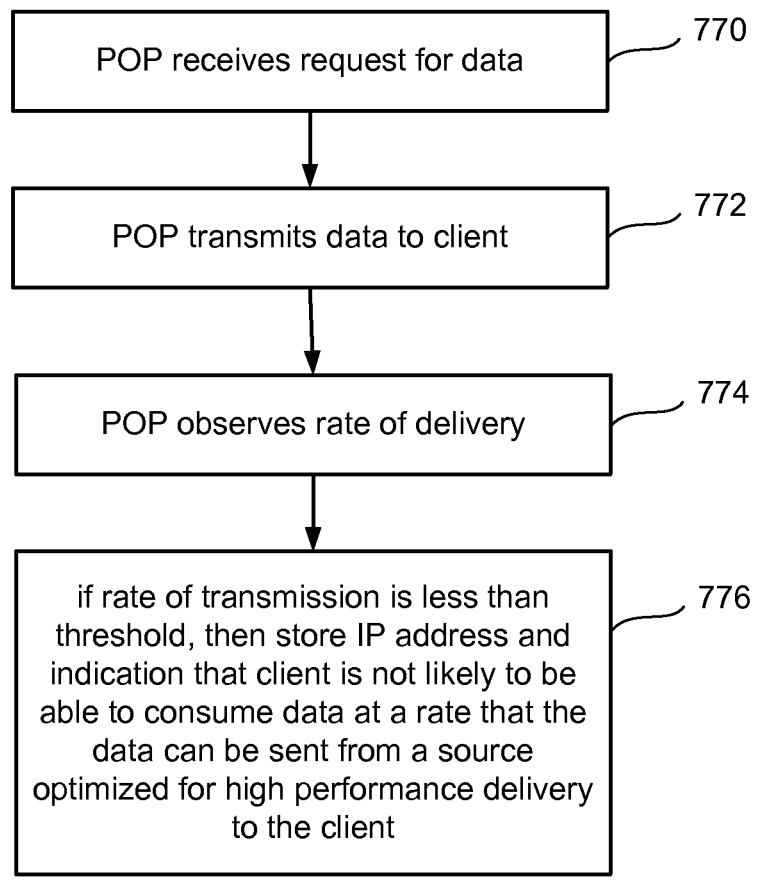
FIG. 15 is a flow chart describing one embodiment for transmitting data to a client.

FIG. 15 is a flow chart describing one embodiment of a process for transmitting data to the client. The process of FIG. 15 is one example for performing step 628 of FIG. 13. In step 770, the POP will receive a request for data. In one embodiment, the appropriate Resource Cache server will electronically receive an HTTP request (e.g., GET) for the appropriate data from client 58. In step 772, the POP's Resource Cache server will generate or acquire the appropriate data and transmit that data to client 58. In step 774, the Resource Cache server of the POP will observe the rate of delivery of data to client 58. If the rate of delivery is less than some threshold rate of delivery (step 776), then the Resource Cache server will store the IP address for client 58 in the database of IP addresses known to be associated with slow clients that not able to consume data at a rate that the data can be sent from a source optimized for high performance delivery to the client. (see step 730 of FIG. 14).

Figure 16:
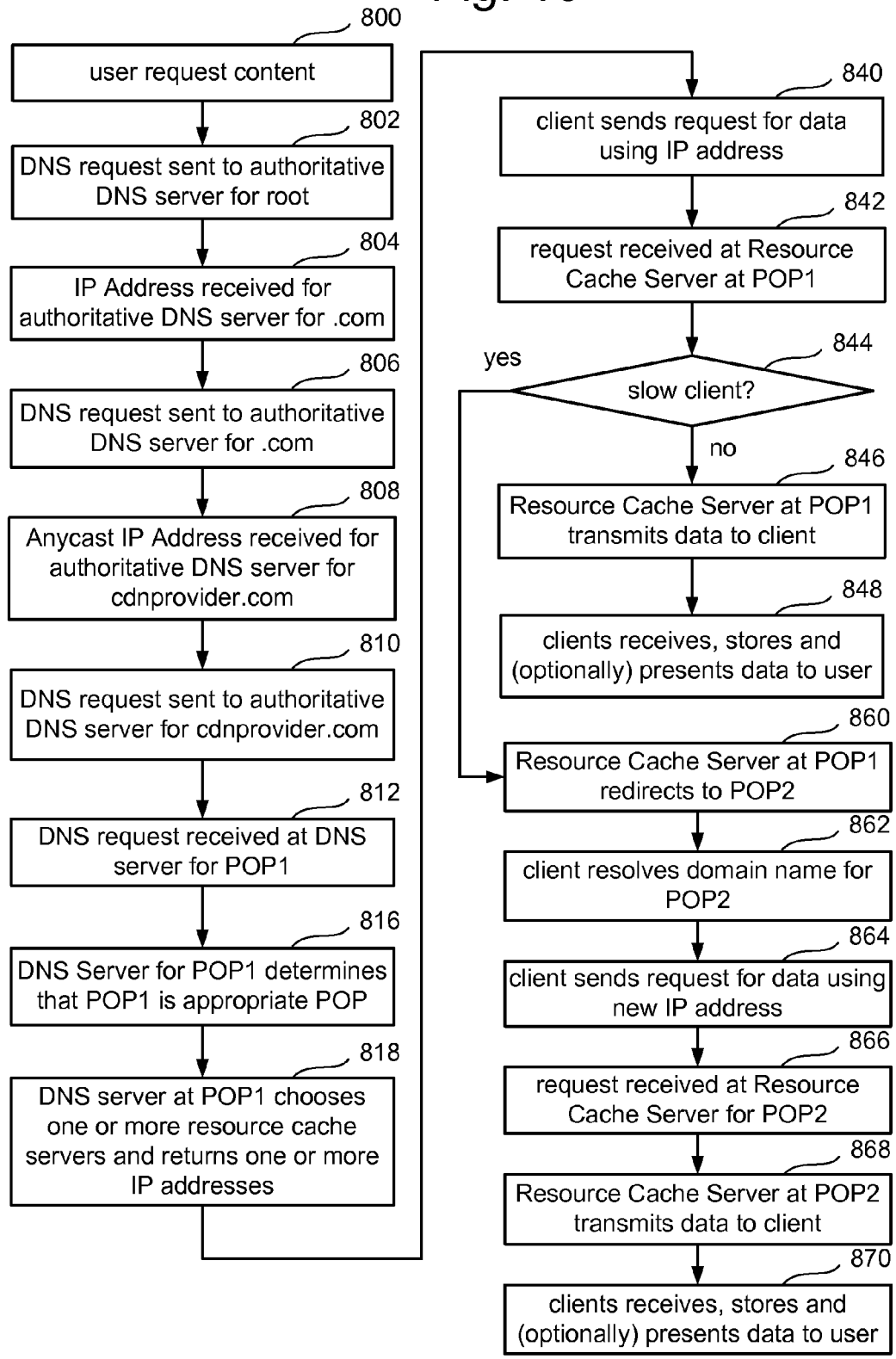
FIG. 16 is a flow chart describing one embodiment for transmitting data from a content delivery network to a client.

In the embodiment of FIG. 13, the determination of whether to redirect the client to a slow connection is made by the DNS server for the POP. In the embodiment of FIG. 16, the decision whether to redirect the client is made by the Resource Cache server. The process of FIG. 16 is another example of performing step 104 of FIG. 4.

In step 800 of FIG. 16, the user requests content. In step 802, a DNS request is sent to the authoritative DNS server for the root domain. In step 804, the authoritative DNS server for the root domain will return an address for the DNS server for .com and that IP address will be received in step 804. A DNS request is then sent to the authoritative DNS server for .com in step 806. In step 808, an Anycast IP address for the authoritative DNS server for cdnprovider.com will be received from the authoritative DNS server for .com. In step 810, a DNS request is sent to the authoritative DNS server for cdnprovider.com. In step 812, the DNS request is received at the DNS server for POP1 (using Anycast). In step 816, the DNS server for POP1 determines that POP1 is the appropriate POP, using the criteria discussed above. In step 818, the DNS server of POP1 chooses one or more Resource Cache servers and returns one or more IP addresses, as discussed above.

In step 840, the client will send a request for data using one of the returned IP addresses from step 818. In step 842, that request for data (e.g., HTTP request) is received at the appropriate Resource Cache server of POP1. In step 844, the Resource Cache server of POP1 will make a determination whether the client is a slow client that is not likely to be able to consume data at a rate that the data can be sent from a source optimized for high performance delivery to the client. If the Resource Cache server determines that the client is not a slow client because it is likely to be able to consume data at a rate that the data can be sent from a source optimized for high performance delivery to the client, then the process continues to step 846 and the Resource Cache server of POP1 transmits the data requested to the client. In step 848, the client will receive that data, store that data and (optionally) present that data to its user.

If, in step 844, the Resource Cache server of POP1 determines that the client is a slow client because it is not likely to be able to consume data at a rate that the data can be sent from a source optimized for high performance delivery to the client then the process continues at step 860 at which the Resource Cache server of POP1 will redirect the client to POP2. In one embodiment, the Resource Cache server of POP1 will provide a HTTP response that includes a 301 redirect. That 301 redirect will identify the domain name for POP2. In step 862, the client will resolve the domain name for POP2 (or a generic domain name for a POP not optimized for high performance delivery to the client) using any of the processes discussed above. In step 864, the client will resend a request for the data using the new IP address from the resolved domain name of POP2. In step 866, the request will be received at the appropriate Resource Cache server for POP2. In step 868, the Resource Cache server of POP2 will transmit the data to the client. In step 870, the client will receive the data, store the data and (optionally) present the data to the user.

One embodiment includes receiving a request for an IP address associated with particular content; determining that a first server at a first point of presence is optimized for high performance delivery to a client associated with the request; providing a first IP address for the first server in response to the request for the IP address; receiving a request, from the client, at the first server for a particular portion of content; transmitting the particular portion of the content to the client from the first server; receiving a request, from the client, at the first server for an additional portion of the content; determining that the client should have a sufficient amount of the content buffered; transmitting a message to the client in response to the request received at the first server for the additional portion of the content and in response to determining that the client should have a sufficient amount of the content buffered, the message indicates that the additional portion of the content should be obtained from a different server; receiving a request for an IP address for the different server; providing a second IP address for a second server at a second point of presence in response to the request for an IP address for the different server, the second point of presence is geographically separated from the first point of presence, the second server is not optimized for high performance delivery; receiving a request, from the client, at the second server for the additional portion of the content; and transmitting the additional portion of the content to the client from the second server, the first server transfers data to the client faster than the second server.

One embodiment includes receiving a request for content at a first server, providing a particular portion of the content to a client from the first server, determining that the client should have a sufficient amount of the content to perform its function with the content, and providing an additional portion of the content to the client from a second server in response to determining that the client should have a sufficient amount of the content to perform its function with the content. The first server provides data to the client faster than the second server.

One embodiment includes receiving a request for content at a first server, providing a particular portion of the content to a client from the first server, determining that the client should have a sufficient amount of the content buffered, and transmitting a message to the client to obtain an additional portion of the content from a different server in response to determining that the client should have a sufficient amount of the content buffered. The first server is optimized for high performance delivery to the client. The second server is not optimized for high performance delivery to the client.

One embodiment includes one or more storage devices storing content, a communication interface, and one or more processors in communication with the one or more storage devices and the communication interface. The one or more processors receive a request for a first portion of and provide the first portion of the content to a client in response via the communication interface. The one or more processors receive a request for a second portion of the content and determine that the client should have a sufficient amount of the content buffered. The one or more processors provide a message to the client via the communication interface to obtain the second portion of the content from a server with slower performance for the client in response to determining that the client should have a sufficient amount of the content buffered.

One embodiment includes one or more processor readable storage devices having processor readable code embodied on the processor readable storage devices. The processor readable code for programming one or more processors to perform a method comprising receiving a request for a first portion of content, providing the first portion of the content to a client from a first server, receiving a request for a second portion of the content, determining that the client should have a sufficient amount of the content buffered, and providing a message to the client to obtain the second portion of the content from a different server in response to determining that the client should have a sufficient amount of the content buffered. The first server is optimized for high performance delivery to the client. The second server is not optimized for high performance delivery to the client. One embodiment includes receiving a request from a user for content, requesting resolution of a domain name for a faster source the content, receiving an IP address for a faster source of the content, requesting resolution of a domain name for a slower source of the content, receiving an IP address for the slower source of the content, requesting a particular portion of the content from the faster source using the IP address for the faster source, receiving the particular portion of the content from the faster source and storing the particular portion of content in a buffer, determining whether the buffer has a sufficient amount of the content so that more content can be obtained before the buffer is entirely consumed, requesting an additional portion of the content from the slower source using the IP address for the slower source, if the buffer has the sufficient amount of the content, requesting the additional portion of the content from the faster source using the IP address for the faster source if the buffer does not have the sufficient amount of the content, and presenting the particular portion of the content and the additional portion of the content to the user.

One embodiment includes receiving a request to perform a function, determining whether a client has sufficient data to perform the function at a particular time, requesting additional data from a source of content optimized for higher performance delivery to the client if the client does not have sufficient data, and requesting additional data from a source of content not optimized for higher performance delivery to the client if the client does have sufficient data. The additional data is received, stored and presented.

One embodiment includes sending a request for a first portion of content to a content delivery network that includes multiple servers storing copies of the content, the first request indicates that high performance is needed for transmission of the first portion of content; receiving the first portion of the content from a server optimized for higher performance delivery; sending additional requests for additional portions of the content to the content delivery network; monitoring how much of the content is buffered, requests of the additional requests sent while sufficient amounts of the content is buffered include an indication that low performance is acceptable for delivery of associated content, requests of the additional requests sent while sufficient amounts of the content are not buffered include an indication that high performance is needed for delivery of associated content; and receiving storing and presenting additional content in response to the additional requests, content received in response requests that include the indication that low performance is acceptable are received from one or more lower performance sources, content received in response requests that include the indication that high performance is needed are received from one or more higher performance sources.

One embodiment includes one or more processor readable storage devices having processor readable code embodied on the processor readable storage devices. The processor readable code is for programming one or more processors to perform a method. The method comprises receiving a request to perform a function pertaining to content, determining whether a client has sufficient data to perform the function at a particular time, requesting additional data from a source optimized for higher performance delivery of content to the client if the client does not have sufficient data, requesting additional data from a source of content that is not optimized for delivery of content to the client if the client does has sufficient data, and receiving the additional data. The additional data is stored and presented to a user.

One embodiment includes one or more storage devices, a communication interface, an output device and one or more processors. The one or more processors are in communication with the one or more storage devices, the communication interface and the output device. The one or more processors receive a request for content and request a particular portion of the content from a source optimized for higher performance delivery of the content to the one or more processors in response to the received request for content. The one or more processors receive the particular portion of the content and store the particular portion of content in the one or more storage devices. The one or more processors determine whether the one or more storage devices have a sufficient amount of the content so that more content can be obtained before the one or more storage devices is entirely consumed. The one or more processors request an additional portion of the content from a source not optimized for higher performance delivery of the content to the one or more processors if the one or more storage devices have the sufficient amount of the content. The one or more processors request the additional portion of the content from the source optimized for higher performance delivery of the content to the one or more processors if the one or more storage devices do not have the sufficient amount of the content. The one or more processors present at least a portion of the content to a user via the output device.

One embodiment includes receiving a request regarding content at a content delivery network. The content delivery network includes multiple servers that can serve copies of the content at similar transmission rates. The multiple servers include a first server at a first geographical location and a second server at a second geographical location. The method further includes determining whether a client associated with the request is using a slower connection, determining a first server that can provide a higher performance transmission of the content to the client due to geographical proximity and transmitting the content from the first server to the client if it is not determined that the client is using a slower connection, and determining a second server that can provide a lower performance transmission of the content to the client due to being geographically remote from the client as compared to the first server and transmitting the content from the second server to the client if it is determined that the client is using a slower connection. The multiple servers include the first server, which at a first geographical location, and the second server, which is at a second geographical location.

One embodiment includes electronically receiving a request for content, automatically determining whether a client associated with the request is likely to be able to consume data at a rate that the data can be sent from a first server that is optimized for high performance transmission to the client, transmitting the content from a first server to the client if it is determined that the client is likely to be able to consume data at the rate that the data can be sent from the first server, and transmitting the content from a second server to the client if it is determined that the client is not likely to be able to consume data at the rate that the data can be sent from the first server.

One embodiment includes electronically receiving a request regarding content from an entity, determining whether a client associated with the request is likely to be able to consume data at a rate that the data can be sent from a source that is optimized for high performance delivery to the client, transmitting a first indication of a server to the entity if it is determined that the client is likely to be able to consume data at the rate that the data can be sent from the source that is optimized for high performance delivery to the client, and transmitting a second indication of a server to the entity if it is determined that the client is not likely to be able to consume data at the rate that the data can be sent from the source that is optimized for high performance delivery to the client. The second indication is different than the first indication.

One embodiment includes electronically receiving a request regarding content, determining whether a client associated with the request is using a slower connection, transmitting the content from a first server to the client if it is determined that the client is using a slower connection, and responding with an indication to use a second server for transmitting content if it is not determined that the client is using a slower connection.

One embodiment includes one or more storage devices storing content, a communication interface, and one or more processors in communication with the one or more storage devices and the communication interface. The one or more processors receive a request regarding content from an entity and determine whether a client associated with the request is likely to be able to consume data at a rate that the data can be sent from a source that is optimized for high performance delivery. The one or more processors transmit a first indication of a server to the entity if it is determined that the client is likely to be able to consume data at the rate that the data can be sent from the source that is optimized for high performance delivery and transmit a second indication of a server to the entity if it is determined that the client is not able to consume data at the rate that the data can be sent from the source that is optimized for high performance delivery. The second indication is different than the first indication.

One embodiment includes one or more processor readable storage devices having processor readable code embodied on said processor readable storage devices. The processor readable code is for programming one or more processors to perform a method comprising electronically receiving a request related to content, automatically determining whether a client associated with the request is likely to be able to consume data at a rate that the data can be sent from a first server that is optimized for high performance delivery, transmitting the content from the first server to the client if it is determined that the client is likely to be able to consume data at the rate that the data can be sent from the first server, and transmitting the content from a second server to the client if it is determined that the client is not likely to be able to consume data at the rate that the data can be sent from the first server.

The foregoing detailed description of the invention has been presented for purposes of illustration and description. It is not intended to be exhaustive or to limit the invention to the precise form disclosed. Many modifications and variations are possible in light of the above teaching. The described embodiments were chosen in order to best explain the principles of the invention and its practical application, to thereby enable others skilled in the art to best utilize the invention in various embodiments and with various modifications as are suited to the particular use contemplated. It is intended that the scope of the invention be defined by the claims appended hereto.

What is claimed is:

1. A method of obtaining content, comprising:
receiving a request for the content from a user;
requesting resolution of a first domain name for a first source of the content, the first source corresponding to a first selected point of presence of a content delivery network, the first selected point of presence being selected based at least in part upon one of geographic proximity or network proximity with respect to the user, the first selected point of presence configured to transmit data at least at a threshold transmission rate;
receiving a first IP address for the first source of the content;
requesting resolution of a second domain name for a second source of the content, the second source corresponding to a second selected point of presence of the content delivery network, the second selected point of presence being selected based at least in part upon (a) the second selected point of presence being more remote to the user than the first selected point of presence with respect to the one of geographic proximity or network proximity, and (b) the first selected point of presence including at least one server capable of transmitting the content at least at the threshold transmission rate, the second selected point of presence configured to transmit data at least at the threshold transmission rate;
receiving a second IP address for the second source of the content;
requesting a particular portion of the content from the first source using the first IP address;
receiving, at least at the threshold transmission rate, the particular portion of the content from the first source and storing the particular portion of the content in a buffer;
determining whether the buffer has a sufficient amount of the content so that more of the content can be obtained before the buffer is entirely consumed;
based at least in part upon determining the buffer has the sufficient amount of the content, requesting an additional portion of the content from the second source using the second IP address;
based at least in part upon determining the buffer does not have the sufficient amount of the content, requesting the additional portion of the content from the first source using the first IP address; and
receiving, at least at the threshold transmission rate, the additional portion of the content.

2. The method of claim 1, further comprising:
receiving a seek command from the user;
requesting a later portion of the content from the first source using the first IP address based at least in part upon the seek command; and
presenting the later portion of the content to the user.

3. The method of claim 1, wherein:
requesting resolution of the second domain name is performed after determining whether the buffer has the sufficient amount of the content;
the content is a movie;
presenting the particular portion of the content includes playing the movie; and
the particular portion of the content is played prior to requesting the additional portion of the content.

4. The method of claim 1, wherein each of requesting resolution of the first domain name for the first source of the content, requesting resolution of the second domain name for the second source of the content, requesting the particular portion of the content, requesting the additional portion of the content from the second source, and presenting the particular portion of the content are performed by a client device.

5. The method of claim 4, wherein:
the first source of the content and the second source of the content are servers chosen to provide the content by one or more entities other than the client device.

6. A method of obtaining content, comprising:
sending a request for the content from a client to a first source corresponding to a first selected point of presence of a content delivery network, the first selected point of presence being selected based at least in part upon one of geographic proximity or network proximity with respect to the client, the first selected point of presence configured to transmit data at least at a threshold transmission rate;
receiving, at least at the threshold transmission rate, a first portion of the content at the client from the first source;
determining whether the client has a threshold amount of the content buffered;
based at least in part upon determining the client does not have the threshold amount, requesting an additional portion of the content from the first source of the content;
based at least in part upon determining the client has the threshold amount, requesting the additional portion from a second source of the content corresponding to a second selected point of presence of the content delivery network, the second selected point of presence being selected based at least in part upon (a) the second selected point of presence being more remote to the client than the first selected point of presence with respect to the one of geographic proximity or network proximity, and (b) the first selected point of presence including at least one server capable of transmitting the content at least at the threshold transmission rate, the second selected point of presence configured to transmit the data at least at the threshold transmission rate; and
receiving, at least at the threshold transmission rate, the additional portion at the client.

7. The method of claim 6, wherein:
determining whether the client has the threshold amount of the content buffered includes determining whether a buffer is sufficiently filled so that the additional portion can be obtained before the additional portion is needed by the client.

8. The method of claim 6, further comprising: requesting, by the client, a first indication of the first source of the content determined to be optimal with respect to delivery of the content to the client;
   receiving, at the client, the first indication of the first source of the content without the client specifically choosing the first source of the content;
   requesting, by the client, a second indication of a second source of the content different from the first source of the content; and
   receiving, at the client, the indication of the second source of the content without the client specifically choosing the second source of the content.

9. The method of claim 6, further comprising:
   requesting resolution of a first domain name associated with the first source of the content;
   requesting the first portion of the content from the first source of the content based at least in part upon resolving the first domain name; and
   prior to determining whether the client has the threshold amount of the content buffered and subsequent to requesting the first portion of the content from the first source, determining the additional portion is needed.

10. The method of claim 9, wherein requesting the additional portion from the second source of the content comprises:
    requesting resolution of a second domain name associated with the second source of the content; and
    requesting the additional portion of the content from the second source of the content based at least in part upon resolving the second domain name.

11. The method of claim 6, wherein the content includes video, the method further comprising:
    playing a portion of the video on a monitor.

12. The method of claim 6, wherein:
    the content includes a web page having embedded data, the embedded data including the additional portion; and
    determining whether the client has the threshold amount of the content buffered includes determining that the additional portion is not initially visible from the client when the web page is displayed by the client.

13. A method of obtaining content, comprising:
    sending a first request from a client for a first portion of the content to a content delivery network that includes multiple points of presence, one or more of the multiple points of presence configured to transmit data at least at a threshold transmission rate;
    receiving, at least at the threshold transmission rate, the first portion of the content from a first server corresponding to a first selected point of presence of the content delivery network, the first selected point of presence being selected based at least in part upon one of geographic proximity or network proximity with respect to the client;
    sending one or more additional requests for additional portions of the content to the content delivery network;
    monitoring how much of the content is buffered, the additional requests for the additional portions indicating an amount of the content that is buffered; and
    receiving, at least at the threshold transmission rate, the additional portions based at least in part upon the additional requests,
    wherein the additional portions of the content received based at least in part upon the additional requests that indicate that a threshold amount of the content has not been buffered are received at a first set of one or more sources corresponding to the first selected point of presence and the additional portions received based at least in part upon the additional requests that indicate that the threshold amount of the content has been buffered are received at a second set of one or more sources corresponding to a second selected point of presence of the content delivery network, the second selected point of presence being selected based at least in part upon (a) the second selected point of presence being more remote to the client than the first selected point of presence with respect to the one of geographic proximity or network proximity, and (b) the first selected point of presence including at least one server capable of transmitting the content at least at the threshold transmission rate.

14. The method according to claim 13, further comprising:
    resolving a first domain name for the first selected point of presence of the content delivery network, the first request being sent to the first selected point of presence based at least in part upon resolving the first domain name for the first point of presence; and
    resolving a second domain name for the second selected point of presence of the content delivery network.

15. One or more processor readable storage devices having processor readable code embodied on the processor readable storage devices, the processor readable code for programming one or more processors to perform a method comprising:
    sending a request for content from a client to a first source corresponding to a first selected point of presence of a content delivery network, the first selected point of presence being selected based at least in part upon one of geographic proximity or network proximity with respect to the client, the first selected point of presence configured to transmit data at least at a threshold transmission rate;
    receiving, at least at the threshold transmission rate, a first portion of the content at the client from the first source;
    determining whether the client has a threshold amount of the content buffered;
    based at least in part upon determining that the client does not have the threshold amount of the content, requesting an additional portion of the content from the first source of the content;
    based at least in part upon determining that the client has the threshold amount of the content, requesting the additional portion from a second source of the content corresponding to a second selected point of presence of the content delivery network, the second selected point of presence being selected based at least in part upon (a) the second selected point of presence being more remote to the client to the client than the first selected point of presence with respect to the one of geographic proximity or network proximity, and (b) the first selected point of presence including at least one server capable of transmitting the content at least at the threshold transmission rate, the second selected point of presence configured to transmit the data at least at the threshold transmission rate; and
    receiving, at least at the threshold transmission rate, the additional portion at the client.

16. The one or more processor readable storage devices of claim 15, wherein the method further comprises:
    requesting resolution of a first domain name associated with the first source;
    requesting the first portion of the content from the first source of the content based at least in part upon resolving the first domain name; and prior to determining whether the client has the threshold amount of the content buffered and subsequent to requesting the first portion of the content from the first source of the content, determining that the additional portion of the content is needed, wherein requesting the additional portion of the content from the second source comprises requesting resolution of a second domain name associated with the second source of the content and requesting the additional portion of the content from the second source of the content based at least in part upon resolving the second domain name.

17. An apparatus that provides content, comprising:
one or more storage devices;
a communication interface;
an output device; and
one or more processors in communication with the one or more storage devices, the communication interface, and the output device, the one or more processors having processor readable code for programming the one or more processors to:
  send a first request from a client to resolve a first domain name for providing the content;
  receive a first address for a first source of the content, the first source being chosen remotely from the one or more processors, the first source of the content corresponding to a first selected point of presence of a content delivery network, the first selected point of presence being selected based at least in part upon one of geographic proximity or network proximity with respect to the client, the first selected point of presence configured to transmit data at least at a threshold transmission rate;
  send a second request to resolve a second domain name for a second source of the content, the second source corresponding to a second selected point of presence of the content delivery network, the second selected point of presence being selected based at least in part upon (a) the second selected point of presence being more remote to the client than the first selected point of presence with respect to the one of geographic proximity or network proximity, and (b) the first selected point of presence including at least one server capable of transmitting the content at least at the threshold transmission rate, the second selected point of presence configured to transmit the data at least at the threshold transmission rate;
  receive a second address for the second source of the content, the second source being chosen remotely from the one or more processors;
  request for a particular portion of the content from the first source;
  receive, at least at the threshold transmission rate, the particular portion of the content from the first source and store the particular portion of the content in the one or more storage devices;
  determine whether the one or more storage devices have a threshold amount of the content;
  request for an additional portion of the content from the first source based at least in part upon determining that the one or more storage devices do not have the threshold amount of the content;
  request for the additional portion of the content from the second source based at least in part upon determining that the one or more storage devices have the threshold amount of the content;
  receive, at least at the threshold transmission rate, the additional portion of the content; and
  present at least a portion of the content via the output device.

* * * * *